(12) United States Patent
Ohno et al.

(10) Patent No.: US 11,731,539 B2
(45) Date of Patent: Aug. 22, 2023

(54) VEHICLE OCCUPANT RESTRAINT DEVICE

(71) Applicant: TOYOTA JIDOSHA KABUSHIKI KAISHA, Toyota (JP)

(72) Inventors: Mitsuyoshi Ohno, Miyoshi (JP); Hiroyuki Tomita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/578,863

(22) Filed: Jan. 19, 2022

(65) Prior Publication Data

US 2022/0266730 A1 Aug. 25, 2022

(30) Foreign Application Priority Data

Feb. 25, 2021 (JP) .................. 2021-029269

(51) Int. Cl.
*B60N 2/42* (2006.01)
*B60R 22/00* (2006.01)
*B60N 2/90* (2018.01)

(52) U.S. Cl.
CPC .............. *B60N 2/42* (2013.01); *B60R 22/001* (2013.01); *B60N 2/995* (2018.02)

(58) Field of Classification Search
CPC ........ B60R 22/001; B60N 2/995; B60N 2/42; B60N 2/4221
USPC ............................................. 297/466, 423.35
See application file for complete search history.

(56) References Cited

U.S. PATENT DOCUMENTS

| | | | | |
|---|---|---|---|---|
| 2,005,294 A * | 6/1935 | Lazare | .................. | A61F 5/3792 2/48 |
| 3,191,994 A * | 6/1965 | Boyce | ..................... | B64G 1/60 297/466 |
| 3,669,107 A * | 6/1972 | Posey | .................. | A61G 5/1054 128/845 |
| 9,802,514 B2 * | 10/2017 | Troyer | .................. | B60R 22/001 |
| 10,232,815 B1 * | 3/2019 | Dry | ....................... | B60R 21/233 |
| 2019/0389414 A1 | 12/2019 | Masuda et al. | | |
| 2020/0130632 A1 | 4/2020 | Sekizuka | | |
| 2020/0223343 A1 | 7/2020 | Ohno | | |

FOREIGN PATENT DOCUMENTS

| | | | |
|---|---|---|---|
| DE | 102021000242 A1 * | 3/2021 | |
| JP | 2018-154169 A | 10/2018 | |
| JP | 2019-043482 A | 3/2019 | |
| JP | 2020-001681 A | 1/2020 | |
| JP | 2020-069816 A | 5/2020 | |
| JP | 2020-111253 A | 7/2020 | |

* cited by examiner

*Primary Examiner* — Milton Nelson, Jr.
(74) *Attorney, Agent, or Firm* — Dinsmore & Shohl LLP

(57) ABSTRACT

A vehicle occupant restraint device includes: a seat cushion on which an occupant is seated; a seat back that is provided on a seat rear side of the seat cushion so as to be pivotable in a seat front-rear direction and that supports a back of the occupant; an ottoman provided on a seat front side of the seat cushion so as to be pivotable in a seat up-down direction; and a fabric restraint member that is extended in a width direction of the ottoman to restrain a lower limb including a knee of the occupant when at least the ottoman is set in a raised position and the seat back takes a comfortable posture.

18 Claims, 23 Drawing Sheets

VEHICLE OCCUPANT RESTRAINT DEVICE

CROSS-REFERENCE TO RELATED APPLICATION

This application claims priority to Japanese Patent Application No. 2021-029269 filed on Feb. 25, 2021, incorporated herein by reference in its entirety.

BACKGROUND

1. Technical Field

The present disclosure relates to a vehicle occupant restraint device.

2. Description of Related Art

A seating device for protecting an occupant is known. At the time of a frontal collision of the vehicle, the seating device expands and deploys an airbag stored in at least one of the seat cushion and the ottoman to receive the lower body (at least one of the waist and lower legs) of the occupant moving forward due to inertial force (see, for example, Japanese Unexamined Patent Application Publication No. 2020-001681 (JP 2020-001681 A)). This seating device can accurately protect the occupant even when the occupant takes a comfortable posture.

A vehicle occupant protection device is also known that expands and deploys a foot airbag stored in the footrest portion of the ottoman to restrain the toes of the occupant at the time of a frontal collision of the vehicle (see, for example, Japanese Unexamined Patent Application Publication No. 2020-069816 (JP 2020-069816 A)).

SUMMARY

In such configurations, however, it is necessary to increase the internal pressure of the airbag and increase the strength and rigidity of the fixing member (ottoman and the like) in order to accurately restrict the behavior of the occupant in a comfortable posture. In addition, depending on the seating posture of the occupant (for example, when the legs are crossed), the lower limbs of the occupant may not be properly restrained. Further, the airbag is expanded and deployed. Therefore, when a malfunction occurs, it is difficult to return the airbag to its original state after the malfunction.

Thus, it is an object of the present disclosure to provide a vehicle occupant restraint device that can appropriately restrain the lower limbs of an occupant without using an airbag, when at least the ottoman is set in a raised position and the seat back takes a comfortable posture.

In order to achieve the above object, a vehicle occupant restraint device according to a first aspect of the present disclosure includes: a seat cushion on which an occupant is seated; a seat back that is provided on a seat rear side of the seat cushion so as to be pivotable in a seat front-rear direction and that supports a back of the occupant; an ottoman provided on a seat front side of the seat cushion so as to be pivotable in a seat up-down direction; and a fabric restraint member that is extended in a width direction of at least the ottoman, out of the ottoman and the seat cushion, to restrain a lower limb including a knee of the occupant when at least the ottoman is set in a raised position and the seat back takes a comfortable posture.

In the disclosure according to the first aspect, the fabric restraint member is extended in the width direction of at least the ottoman, out of the ottoman and the seat cushion, to restrain a lower limb including a knee of the occupant when at least the ottoman is set in a raised position and the seat back takes a comfortable posture. Thereby, the lower limbs of the occupant are appropriately restrained by the fabric restraint member from the initial stage of a frontal collision of the vehicle, and the occurrence of a so-called submarine phenomenon is effectively suppressed. Moreover, since airbags are not used, malfunction is less likely to occur. The comfortable posture is a posture in which the seat back is tilted backward such that the angle between the seat back and the seat cushion is equal to or larger than a predetermined angle.

A vehicle occupant restraint device according to a second aspect is the vehicle occupant restraint device according to the first aspect, in which the fabric restraint member is fixed with a plurality of fixtures provided on at least opposite side portions of the ottoman in the width direction, out of the opposite side portions of the ottoman in the width direction and opposite side portions of a seat frame in a width direction, the seat frame supporting the seat cushion, the fixtures being spaced apart from each other in the seat front-rear direction, or fixed with a plurality of fixtures provided on a floor portion of a vehicle cabin that is located on both sides of the ottoman and the seat cushion in the width direction in a plan view, the fixtures being spaced apart from each other in the seat front-rear direction.

In the disclosure according to the second aspect, the fabric restraint member is fixed with the fixtures (fixing points) provided on at least the opposite side portions of the ottoman in the width direction (restraint positions), out of the opposite side portions of the ottoman in the width direction and the opposite side portions of the seat frame in the width direction, the fixtures being spaced apart from each other in the seat front-rear direction, or fixed with the fixtures (fixing points) provided on the floor portion (restraint position) of the vehicle cabin that is located on both sides of the ottoman and the seat cushion in the width direction in a plan view, the fixtures being spaced apart from each other in the seat front-rear direction. Thus, when the vehicle is involved in a frontal collision, the load input from the occupant to the fabric restraint member is distributed to the fixing points, and stable lower limb restraint performance can be obtained.

A vehicle occupant restraint device according to a third aspect is the vehicle occupant restraint device according to the second aspect, in which the fixtures are each configured such that a first mold portion and a second mold portion are detachably fitted with each other.

In the disclosure according to the third aspect, the fixtures are each configured such that a first mold portion and a second mold portion are detachably fitted with each other. Thus, the fabric restraint member can be easily attached to the restraint position.

A vehicle occupant restraint device according to a fourth aspect is the vehicle occupant restraint device according to any one of the first aspect to the third aspect, in which the fabric restraint member has a function of improving comfort during sleep.

In the disclosure according to the fourth aspect, the fabric restraint member has a function of improving comfort during sleep. Therefore, the occupant can sleep comfortably. Examples of the fabric restraint member having a function of improving comfort during sleep include a blanket or a blanket made by toweling.

A vehicle occupant restraint device according to a fifth aspect is the vehicle occupant restraint device according to any one of the first aspect to the fourth aspect and further includes a rear load transmission member that transmits a load input from the occupant to the ottoman to the seat frame supporting the seat cushion at a time of a frontal collision of a vehicle.

In the disclosure according to the fifth aspect, the rear load transmission member transmits a load input from the occupant to the ottoman to the seat frame supporting the seat cushion at the time of a frontal collision of the vehicle. Thus, the strength and the rigidity of the ottoman are improved with a simple configuration.

A vehicle occupant restraint device according to a sixth aspect is the vehicle occupant restraint device according to the fifth aspect, in which one end of the rear load transmission member is disposed close to a fixing point of the fabric restraint member.

In the disclosure according to the sixth aspect, one end of the rear load transmission member is disposed close to the fixing point of the fabric restraint member. Therefore, the load input from the knees of the occupant to the fabric restraint member is effectively transmitted to the seat frame.

A vehicle occupant restraint device according to a seventh aspect is the vehicle occupant restraint device according to any one of the first aspect to the sixth aspect and further includes a front load transmission member that transmits a load input from the occupant to the ottoman to a floor portion of a vehicle cabin at a time of a frontal collision of a vehicle.

In the disclosure according to the seventh aspect, the front load transmission member transmits a load input from the occupant to the ottoman to the floor portion of the vehicle cabin at the time of a frontal collision of a vehicle. Thus, the strength and the rigidity of the ottoman are improved with a simple configuration, and the seat cushion is suppressed from falling toward the front side of the seat.

A vehicle occupant restraint device according to an eighth aspect is the vehicle occupant restraint device according to any one of the first aspect to the seventh aspect and further includes a toe restraint member that projects from a seat front side of the ottoman to a seat upper side to restrain a toe of the occupant when at least the ottoman is set in the raised position and the seat back takes a comfortable posture.

In the disclosure according to the eighth aspect, the toe restraint member for restraining a toe of the occupant projects from the seat front side of the ottoman to the seat upper side when at least the ottoman is set in the raised position and the seat back takes a comfortable posture. Thus, at the time of a frontal collision of the vehicle, the toe restraint member suppresses the toe portion of the occupant from flipping, and the occurrence of a so-called submarine phenomenon is effectively suppressed.

A vehicle occupant restraint device according to a ninth aspect is the vehicle occupant restraint device according to the eighth aspect, in which the toe restraint member is configured such that a length of the toe restraint member is electrically adjustable in accordance with a size of a foot of the occupant.

In the disclosure according to the ninth aspect, the length of the toe restraint member is electrically adjusted in accordance with the size of the foot of the occupant. Therefore, regardless of the size of the occupant's foot, the toe portion of the occupant is effectively suppressed from flipping.

A vehicle occupant restraint device according to a tenth aspect is the vehicle occupant restraint device according to the eighth aspect or the ninth aspect, in which the toe restraint member has a shape in which a toe portion is raised upright in advance.

In the disclosure according to the tenth aspect, the toe portion of the toe restraint member is raised upright in advance. Therefore, the structure of the toe restraint member is simplified as compared with the case where the toe portion of the toe restraint member is configured to be pivotable.

As described above, with the present disclosure, it is possible to appropriately restrain the lower limbs of an occupant without using an airbag, when at least the ottoman is set in the raised position and the seat back takes a comfortable posture.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described in detail with reference to the drawings. For convenience of description, the arrow UP, the arrow FR, and the arrow RH appropriately shown in the figures indicate the upward direction of a vehicle seat 20, the forward direction of the vehicle seat 20, and the right direction of the vehicle seat 20, respectively. Further, the left-right direction of the vehicle seat 20 is defined as the width direction of the vehicle seat 20. In the present embodiment, an example is adopted in which the vehicle seat 20 provided in the passenger seat of a right-hand drive vehicle (not shown).

First Embodiment

Figure 1:
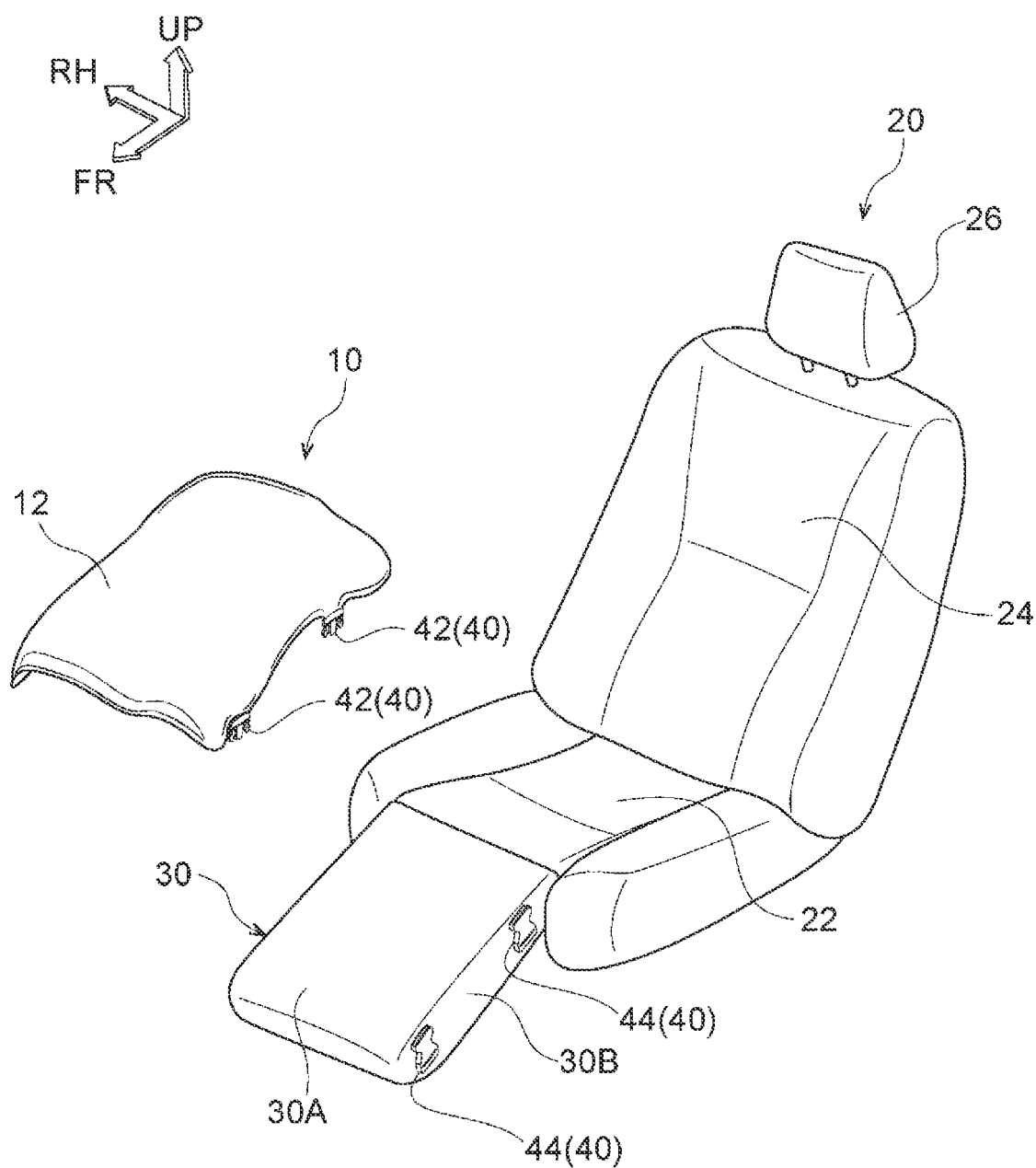
FIG. 1 is a perspective view showing a fabric restraint member of a vehicle occupant restraint device and a vehicle seat according to a first embodiment.
Figure 2:
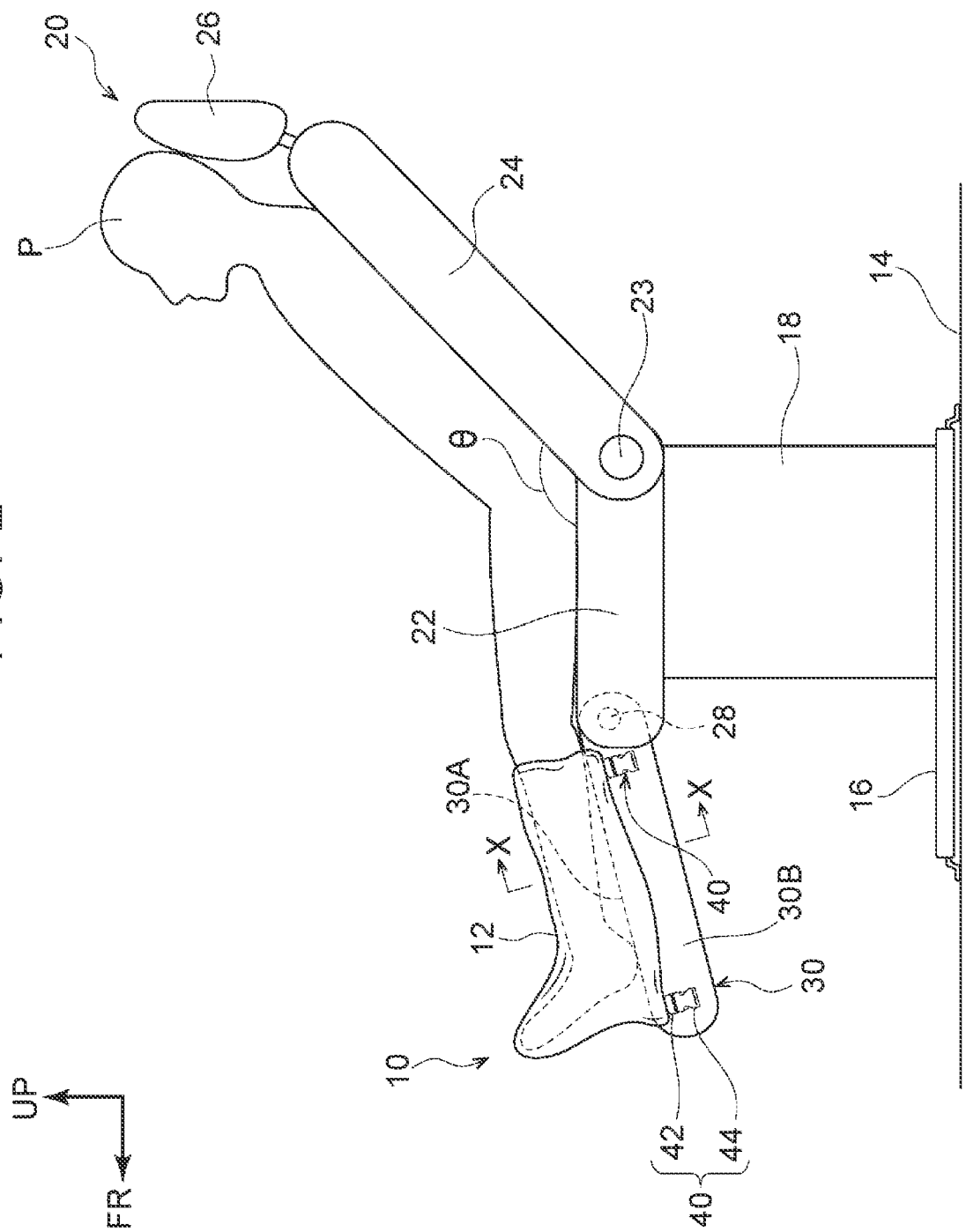
FIG. 2 is a side view showing the vehicle seat to which the fabric restraint member according to the first embodiment is attached.

First, a first embodiment will be described. As shown in FIGS. 1 and 2, the vehicle seat 20 to which a fabric restraint member 12 constituting a vehicle occupant restraint device 10 according to the first embodiment is attached includes a seat cushion 22 on which an occupant P is seated, a seat back 24 that is provided on the rear side of the seat cushion 22 and is configured to be pivotable in the front-rear direction around a pivot shaft 23 by an electric reclining mechanism (not shown) and to support the back of the occupant P, and a headrest 26 that is provided on the upper end of the seat back 24 so as to be able to move up and down and that supports the head of the occupant P.

As shown in FIG. 2, the seat cushion 22 is supported by a pair of right and left seat frames 18 having a generally rectangular flat plate shape. A pair of right and left seat rails 16 extending in the front-rear direction is provided on the floor panel 14 constituting the floor of the vehicle cabin. The seat frames 18 are supported by the seat rails 16 so as to be slidable with an electric seat slide mechanism (not shown) and able to be locked and unlocked at multiple positions.

This enables the vehicle seat 20 to be disposed at an appropriate position on the seat rails 16 for the occupant P seated on the seat cushion 22. When the occupant P takes a comfortable posture described later, the vehicle seat 20 is mainly disposed at the rearmost portion of the seat rails 16 (see FIG. 2).

The vehicle seat 20 also includes an ottoman 30 that is provided on the front side and the lower side of the seat cushion 22 and that supports the legs (calves) of the occupant P seated on the seat cushion 22 from below as a front side portion (front end) thereof rises, and a recliner (not shown) serving as a drive device for pivoting the front end of the ottoman 30 in the up-down direction around a pivot shaft 28 provided at the rear end of the ottoman 30 (the front end of the seat cushion 22).

The recliner is provided at least on one end side of the pivot shaft 28 in the axial direction, and is a known drive device that electrically pivots the front end of the ottoman 30 in the up-down direction around the pivot shaft 28. With this recliner, the ottoman 30 is configured to be stopped at any position including the uppermost position shown in FIG. 2 and the lowermost position (hereinafter referred to as "lowered position") shown in FIG. 9 described later. In the present embodiment, the position to which the ottoman 30 is raised from the lowered position is referred to as a "raised position", and the raised position includes a position in the case where the ottoman 30 is positioned at the uppermost position.

When using the ottoman 30, the occupant P operates a comfort (sleep) mode transition switch (not shown) provided in the vehicle cabin while the occupant P is seated on the seat cushion 22. Then, the front end of the ottoman 30 is raised (moved) by the recliner around the pivot shaft 28. As a result, the legs (calves) of the occupant P can be lifted while being supported from below by the ottoman 30.

Figure 3:
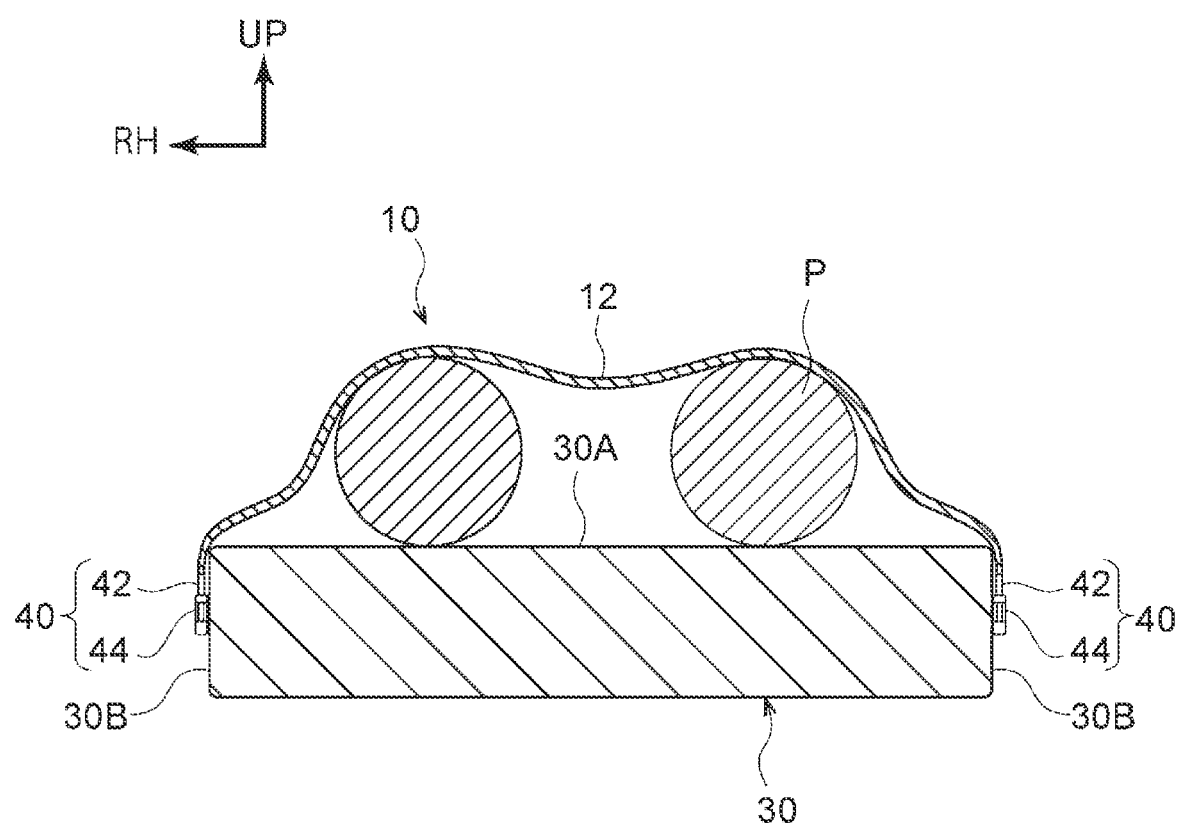
FIG. 3 is an enlarged cross-sectional taken along line X-X of FIG. 2.

Further, as shown in FIGS. 1 to 3, the ottoman 30 is provided with a fabric restraint member 12 capable of restraining the lower limbs including the knees of the occupant P seated on the seat cushion 22. The fabric restraint member 12 has such a size as to cover at least the entire surface 30A of the ottoman 30 and restrict the movement of the lower limbs of the occupant P in a direction away from the surface 30A of the ottoman 30 when fixed with fixtures 40 described later.

A plurality of (for example, two) first mold portions 42 of the fixtures 40 is provided at both ends of the fabric restraint member 12 in the width direction with the two first mold portions 42 being spaced apart from each other in the front-rear direction. A plurality of (for example, two) second mold portions 44 of the fixtures 40 is provided on both side surfaces 30B serving as the opposite side portions of the ottoman 30 in the width direction with the two second mold portions 44 being spaced apart from each other in the front-rear direction.

The fixtures 40 are each configured to be attachable and detachable by projection-and-recess fitting of the first mold portion 42 (projection) and the second mold portion 44 (recess). Thus, the fabric restraint member 12 is configured such that when at least the ottoman 30 is set in the raised position and the seat back 24 takes a comfortable posture (before such operations), the fabric restraint member 12 is extended in the width direction of the ottoman 30 as the first mold portions 42 are fitted to the second mold portions 44 manually by the occupant P.

Parts at which the second mold portions 44 of the fixtures 40 are provided are the restraint positions and also the "fixing points" in the present embodiment. The "comfortable posture" in the present embodiment means a posture obtained by tilting the seat back 24 rearward such that an angle θ (see FIG. 2) between the seat cushion 22 and the seat back 24 is equal to or larger than a predetermined angle (for example, 130 degrees). The comfortable posture includes a lying (sleeping) posture. Each fixture 40 is also provided with a sensor (not shown) for detecting that the first mold portion 42 is fitted to the second mold portion 44. Thus, fitting and release of fitting between the first mold portion 42 and the second mold portion 44 (attachment and detachment of the fixture 40) are detected.

Further, a speaker (not shown) for generating a warning sound (for example, a voice alert) is provided in the vehicle cabin. Therefore, for example, when the sensor detects that one first mold portion 42 has come off the second mold portion 44 and the comfort mode transition switch is operated in that state (the ottoman 30 is raised and the seat back 24 is tilted rearward by a predetermined angle or more), a warning sound is generated from the speaker.

When the warning sound is generated, the operation of the comfort mode transition switch is disabled. That is, unless the fabric restraint member 12 is extended in the width direction of the ottoman 30, a control device (not shown) provided in the vehicle performs control such that the ottoman 30 is not raised and the seat back 24 cannot be tilted rearward by a predetermined angle or more (for example, the energization of the recliner and the electric reclining mechanism is cut off).

It should be noted that the detection that the first mold portion 42 is fitted to the second mold portion 44 is not performed only by the sensor. For example, a configuration may be adopted in which the fixtures 40 are not provided with sensors, a camera (not shown) capable of imaging the fixtures 40 (second mold portions 44) is provided in the vehicle cabin, and fitting of the first mold portions 42 to the second mold portions 44 are detected with the image recognition function of the camera.

Next, the operation of the vehicle occupant restraint device 10 according to the first embodiment having the above configuration will be described.

Figure 4:
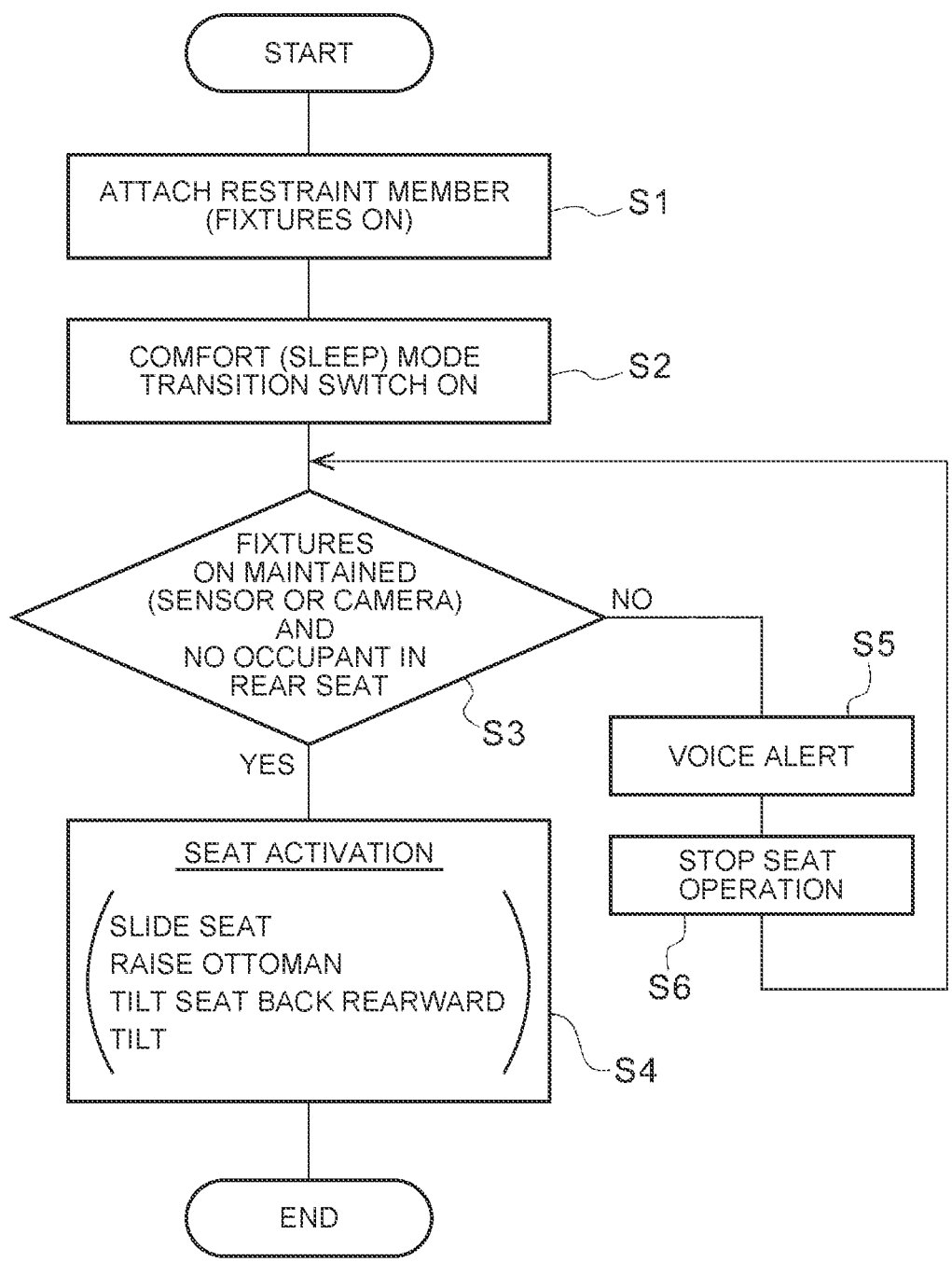
FIG. 4 is a flowchart showing operations of the vehicle occupant restraint device provided with the fabric restraint member according to the first embodiment.

As shown in FIG. 4, when the occupant P takes a comfortable posture while the vehicle is traveling, the fabric restraint member 12 is attached to the ottoman 30 (step S1). That is, the occupant P manually fits the first mold portions 42 of the fixtures 40 provided on the fabric restraint member 12 to the second mold portions 44 of the fixtures 40 provided on the side surfaces 30B of the ottoman 30. Then, the sensor or the camera recognizes that the fixtures are ON (attached).

Subsequently, the occupant P operates the comfort (sleep) mode transition switch provided in the vehicle cabin (step S2). Then, whether the state in which each first mold portion 42 is fitted to the second mold portion 44 is maintained (whether the fixture ON continues) and whether another occupant is seated in the rear seat are determined (step S3). Whether the other occupant is seated in the rear seat is determined by the image recognition function of the camera provided in the vehicle cabin.

Here, when it is detected by the sensor or the camera that the fitting between the first mold portions 42 and the second mold portions 44 is maintained (fixtures ON continues) and no other occupant is seated in the rear seat, the vehicle seat 20 is activated (step S4). That is, the operation of the comfort mode transition switch is enabled, and through the control of the control device, the ottoman 30 is raised and the seat back 24 is tilted rearward by a predetermined angle or more.

At this time, the seat frames 18 may be automatically slid to the rearmost positions on the seat rails 16 by the electric seat slide mechanism. Further, the posture of the seat cushion 22 may be automatically changed by an electric tilt mechanism (not shown) such that the rear part of the seat cushion 22 is positioned lower than the front part.

On the other hand, when it is detected by the sensor or the camera that at least one of the first mold portions 42 is not fitted to (has come off) the second mold portion 44, or another occupant is seated in the rear seat, a voice alert is generated (step S5) and the operation of the vehicle seat 20 is stopped (step S6). That is, the operation of the comfort mode transition switch is disabled, and through the control of the control device, the ottoman 30 is not raised and the seat back 24 is not tilted rearward by a predetermined angle or more.

As described above, according to the first embodiment, only when the fabric restraint member 12 for restraining the lower limbs including the knees of the occupant P is extended in the width direction of the ottoman 30, the ottoman 30 is set in the raised position and the seat back 24 can take a comfortable posture. In other words, the fabric restraint member 12 is always extended in the width direction of the ottoman 30 only when the ottoman 30 is set in the raised position and the seat back 24 takes a comfortable posture.

The fabric restraint member 12 has such a size as to cover at least the entire surface 30A of the ottoman 30 and restrict the movement of the lower limbs of the occupant P in a direction away from the surface 30A of the ottoman 30 when fixed with fixtures 40. Therefore, from the initial stage of the frontal collision of the vehicle, the lower limbs of the occupant P in a comfortable posture can be appropriately restrained by the fabric restraint member 12, which effectively suppresses or reduces occurrence of a so-called submarine phenomenon for the occupant P.

More specifically, if the fabric restraint member 12 is not provided on the ottoman 30, the occupant P in a comfortable posture cannot resist the inertial force and leans further rearward, at the time of a frontal collision of the vehicle. Then, as shown in FIG. 5B, a lumbar portion Pw of the occupant P moves forward, so the occupant P easily comes off a seatbelt SB (a submarine phenomenon occurs).

Figure 5A:
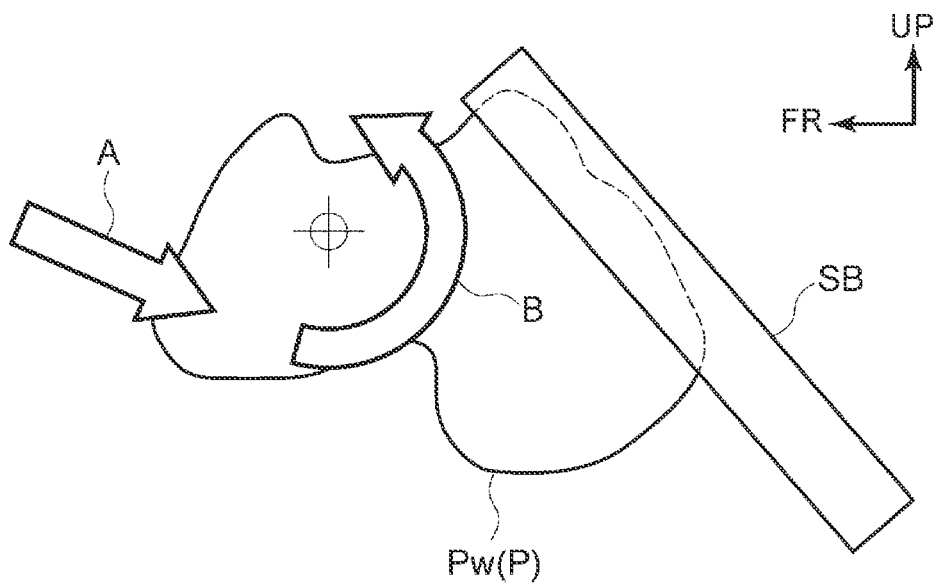
FIG. 5A is a schematic view showing the behavior of a lumbar portion of an occupant when a vehicle provided with the vehicle occupant restraint device according to the first embodiment is involved in a frontal collision.
Figure 5B:
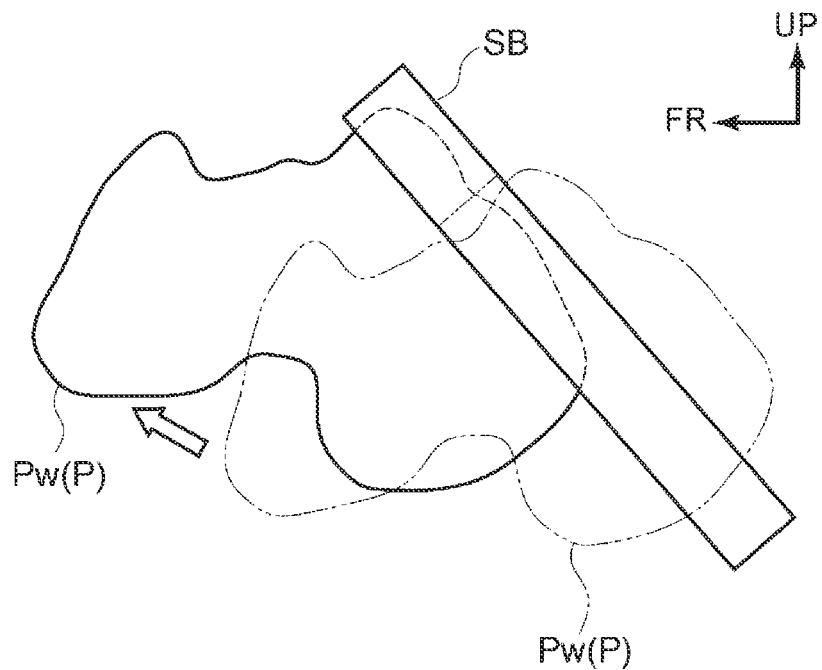
FIG. 5B is a schematic view showing the behavior of the lumbar portion of the occupant when the vehicle not equipped with the vehicle occupant restraint device according to the first embodiment is involved in a frontal collision.

However, when the fabric restraint member 12 is provided on the ottoman 30, at the time of a frontal collision of the vehicle, a reaction force toward the rear side is generated with respect to the lumbar portion Pw of the occupant P due to the fabric restraint member 12 as shown by an arrow A in FIG. 5A, and the lumbar portion Pw of the occupant P rotates in the counterclockwise direction indicated by an arrow B in FIG. 5A (leans forward). This causes the occupant P to take a forward leaning posture, which suppresses the forward movement of the lumbar portion Pw and makes it difficult for the occupant P to come off the seatbelt SB (occurrence of the submarine phenomenon is suppressed or reduced).

Further, the fixtures 40 are each configured such that the first mold portion 42 and the second mold portion 44 are detachably fitted with each other. Therefore, the fabric restraint member 12 can be easily attached to the restraint position (fixing point). For the illustrated fixture 40, the fabric restraint member 12 is provided with the first mold portion 42 and the ottoman 30 is provided with the second mold portion 44, but the reverse is also possible.

According to the first embodiment, the fabric restraint member 12, rather than the airbag, restrains the lower limbs including the knees of the occupant P. That is, the vehicle occupant restraint device 10 according to the first embodiment does not use an airbag (inflator). Therefore, malfunction is less likely to occur as compared with the case of using airbags (inflators).

The fabric restraint member 12 also has a function of improving comfort during sleep. That is, the fabric restraint member 12 is constituted by a blanket, a blanket made by toweling, a futon, or the like. Thus, the occupant P seated on the vehicle seat 20 of the passenger seat can sleep in a comfortable state.

Figure 6:
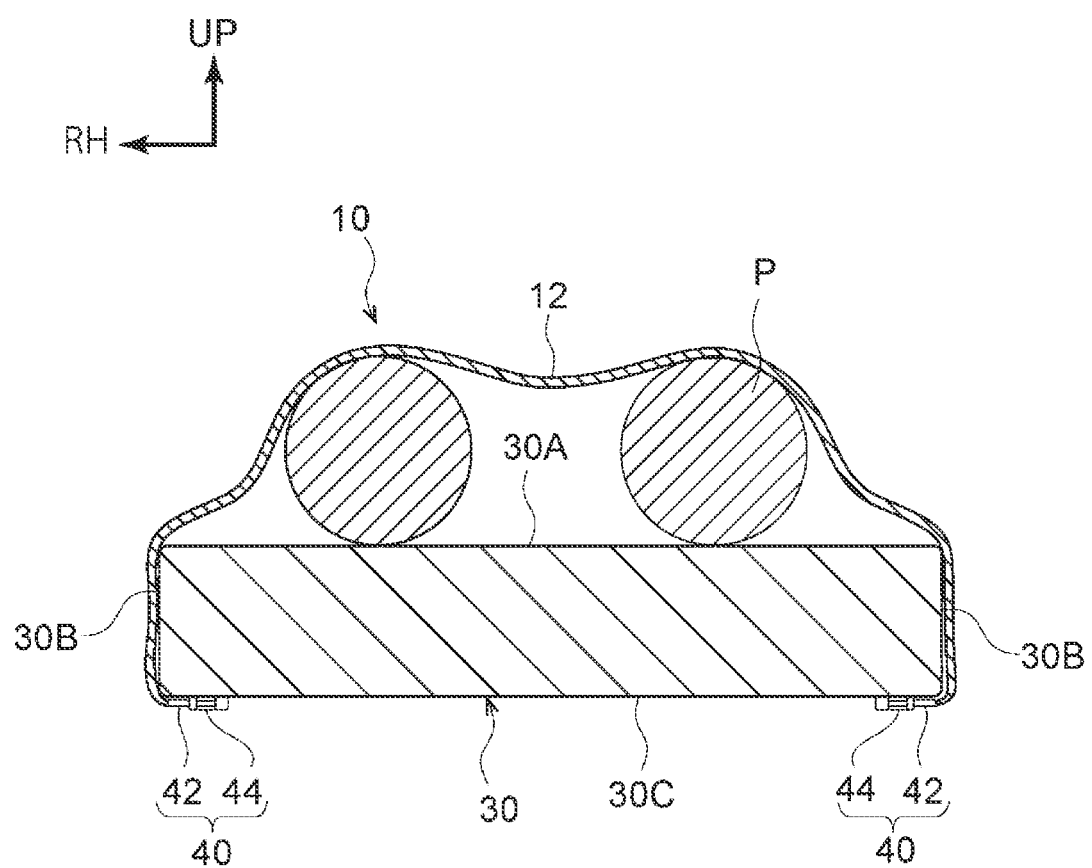
FIG. 6 is an enlarged cross-sectional view corresponding to FIG. 3, showing a modification of fixing points of the fabric restraint member according to the first embodiment.

Further, the fixing points of the fabric restraint member 12 (the restraint positions where the second mold portions 44 are provided) are not limited to the positions shown in FIGS. 1 to 3. The fixing points of the fabric restraint member 12 may be provided at the positions shown in FIG. 6, for example. That is, rather than the side surfaces 30B of the ottoman 30, portions of a lower surface (back surface) 30C of the ottoman 30 that are close to the side surfaces 30B may be adopted.

When the fixing points of the fabric restraint member 12 are provided at portions of the lower surface 30C of the ottoman 30 that are close to the side surfaces 30B, a load input from the occupant P to the fabric restraint member 12 at the time of a frontal collision of the vehicle can be received more efficiently, compared with a case where the fixing points are provided on the side surfaces 30B of the ottoman 30.

In the first embodiment, not only the side surfaces 30B of the ottoman 30 but also the portions of the lower surface 30C of the ottoman 30 that are close to the side surfaces 30B are defined as the opposite side portions of the ottoman 30 in the width direction. In this case, the fabric restraint member 12 has such a size as to cover at least the surface 30A and the side surfaces 30B of the ottoman 30 and restrict the movement of the lower limbs of the occupant P in a direction away from the surface 30A of the ottoman 30 when fixed with fixtures 40.

Figure 7:
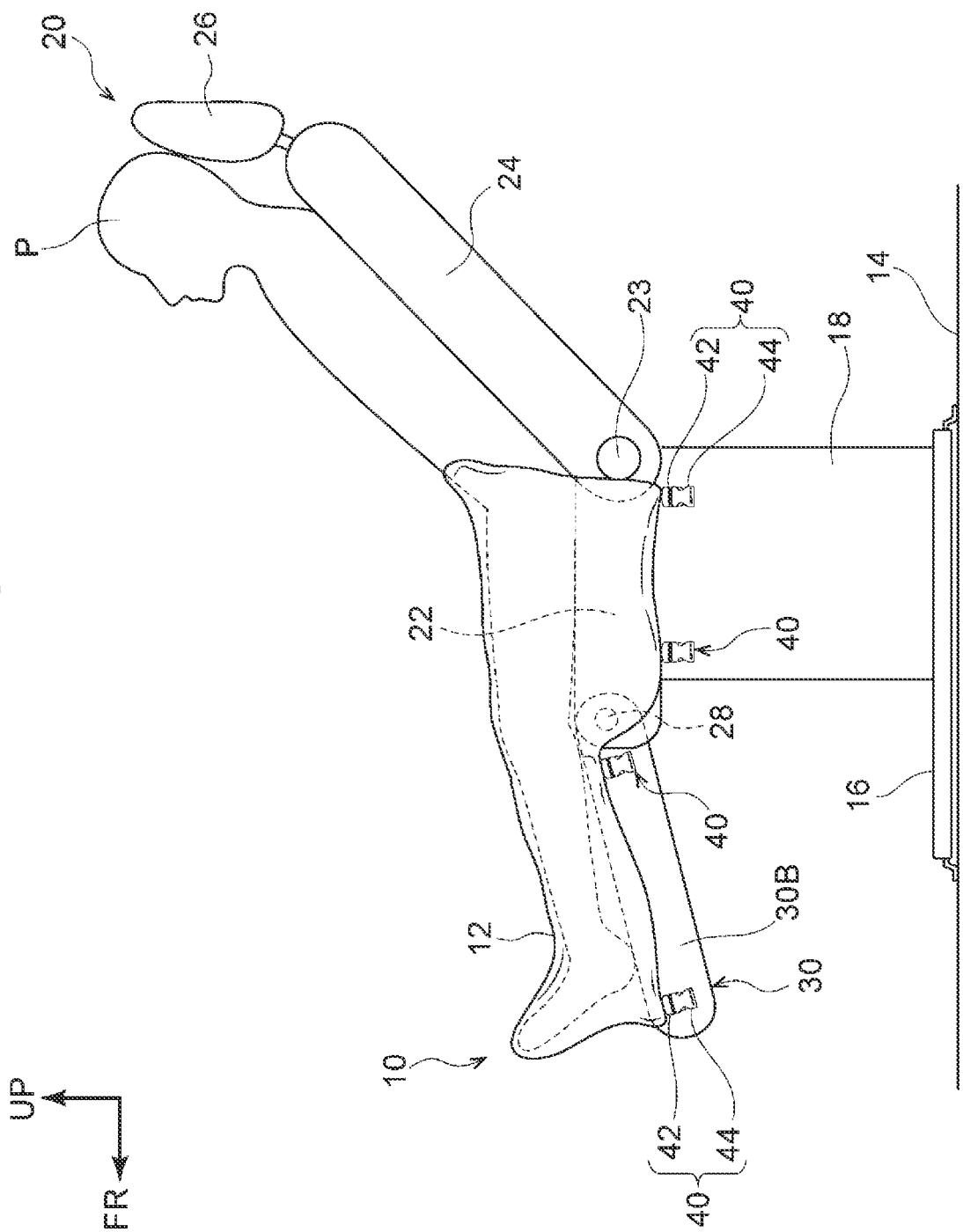
FIG. 7 is a side view corresponding to FIG. 2, showing a first modification of the fabric restraint member according to the first embodiment.

Further, the fabric restraint member 12 is not limited to the mode in which the fabric restraint member 12 has such a size as to cover the surface 30A and the side surfaces 30B of the ottoman 30. For example, the fabric restraint member 12 may have such a size as to further cover the surface and the side surfaces of the seat cushion 22, as shown in FIG. 7. In this case, four first mold portions 42 may be provided at both ends of the fabric restraint member 12 in the width direction so as to be spaced apart from each other in the front-rear direction, and two second mold portions 44 may be additionally provided on each of the outer side surfaces (opposite side portions in the width direction) of the seat frames 18 so as to be spaced apart from each other in the front-rear direction.

Figure 8:
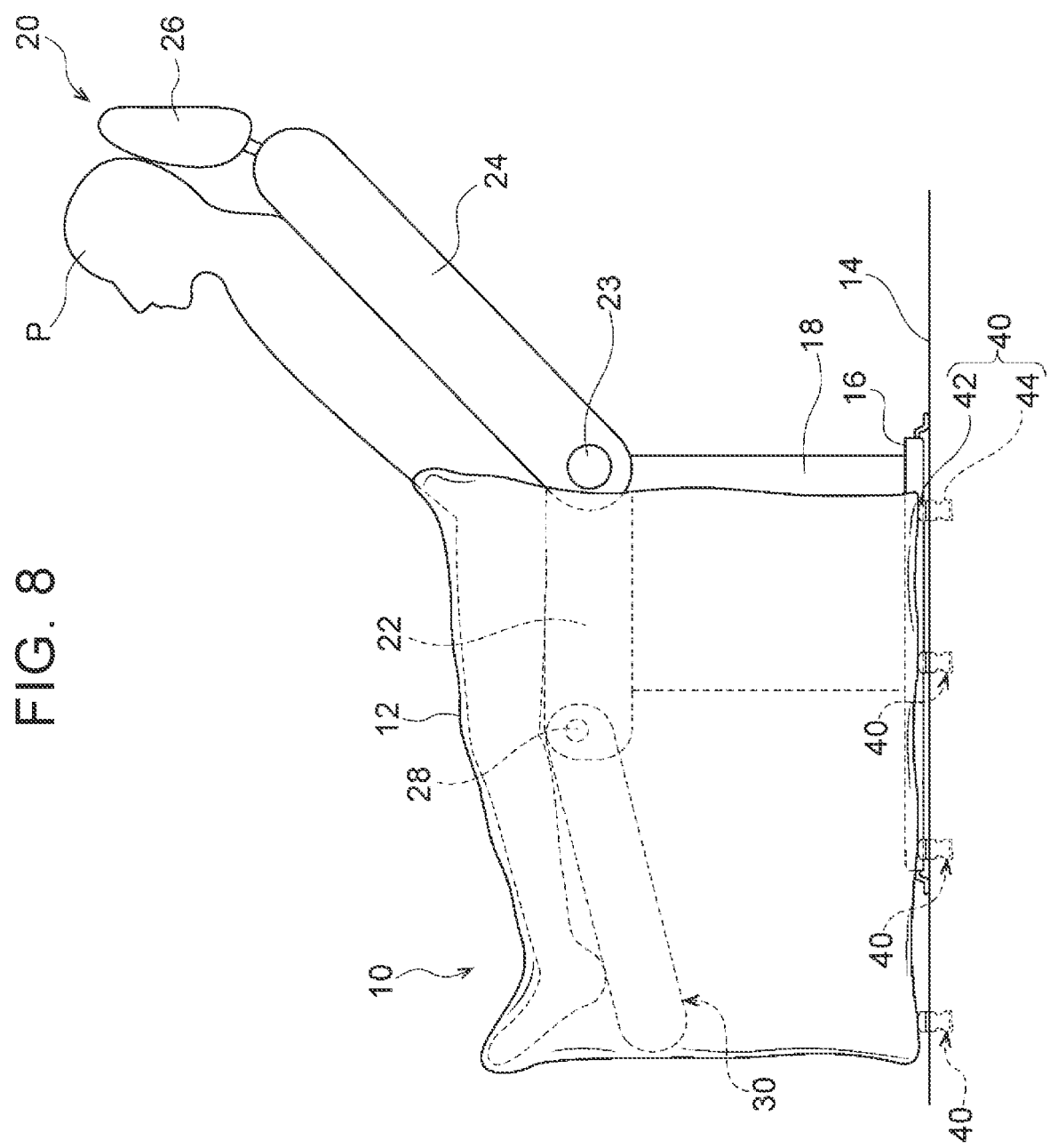
FIG. 8 is a side view corresponding to FIG. 2, showing a second modification of the fabric restraint member according to the first embodiment.

Further, as shown in FIG. 8, for example, the fabric restraint member 12 may have a shape that is long in the width direction such that both ends thereof in the width direction reach the floor panel 14. In this case, four second mold portions 44 may be provided to a part of the floor panel 14 or a part of the underbody (not shown) exposed from the floor panel 14 on each side of the ottoman 30 and the seat cushion 22 in the width direction in a plan view, so as to be spaced apart from each other in the front-rear direction.

In this way, when at least the ottoman 30 is set in the raised position and the seat back 24 takes a comfortable posture (before these operations), the fabric restraint member 12 that restrains the lower limbs including the knees of the occupant P is extended in the width direction of the ottoman 30 with the plurality of fixtures 40 (first mold portions 42 that are fitted to the second mold portions 44) provided at both ends of the fabric restraint member 12 in the width direction so as to be spaced apart from each other in the front-rear direction.

More specifically, the fabric restraint member 12 is fixed with the fixtures 40 provided on at least the opposite side portions of the ottoman 30 in the width direction, out of the opposite side portions of the ottoman 30 in the width direction and the opposite side portions of the seat frames 18 in the width direction, so as to be spaced apart from each other in the front-rear direction, or fixed with the fixtures 40 provided on the floor portion of the vehicle cabin that is located on both sides of the ottoman 30 and the seat cushion 22 in the width direction in a plan view, so as to be spaced apart from each other in the front-rear direction.

Therefore, the load input from the occupant P to the fabric restraint member 12 at the time of a frontal collision of the vehicle can be effectively and efficiently distributed to the fixtures 40 (fixing points). Thus, according to the first embodiment, stable lower limb restraint performance can be obtained. In the first embodiment, the underbody described above is also regarded as the floor portion of the vehicle cabin.

Second Embodiment

Next, a second embodiment will be described. The same parts as those in the first embodiment are designated by the same reference signs, and detailed description thereof will be omitted as appropriate.

Figure 10:
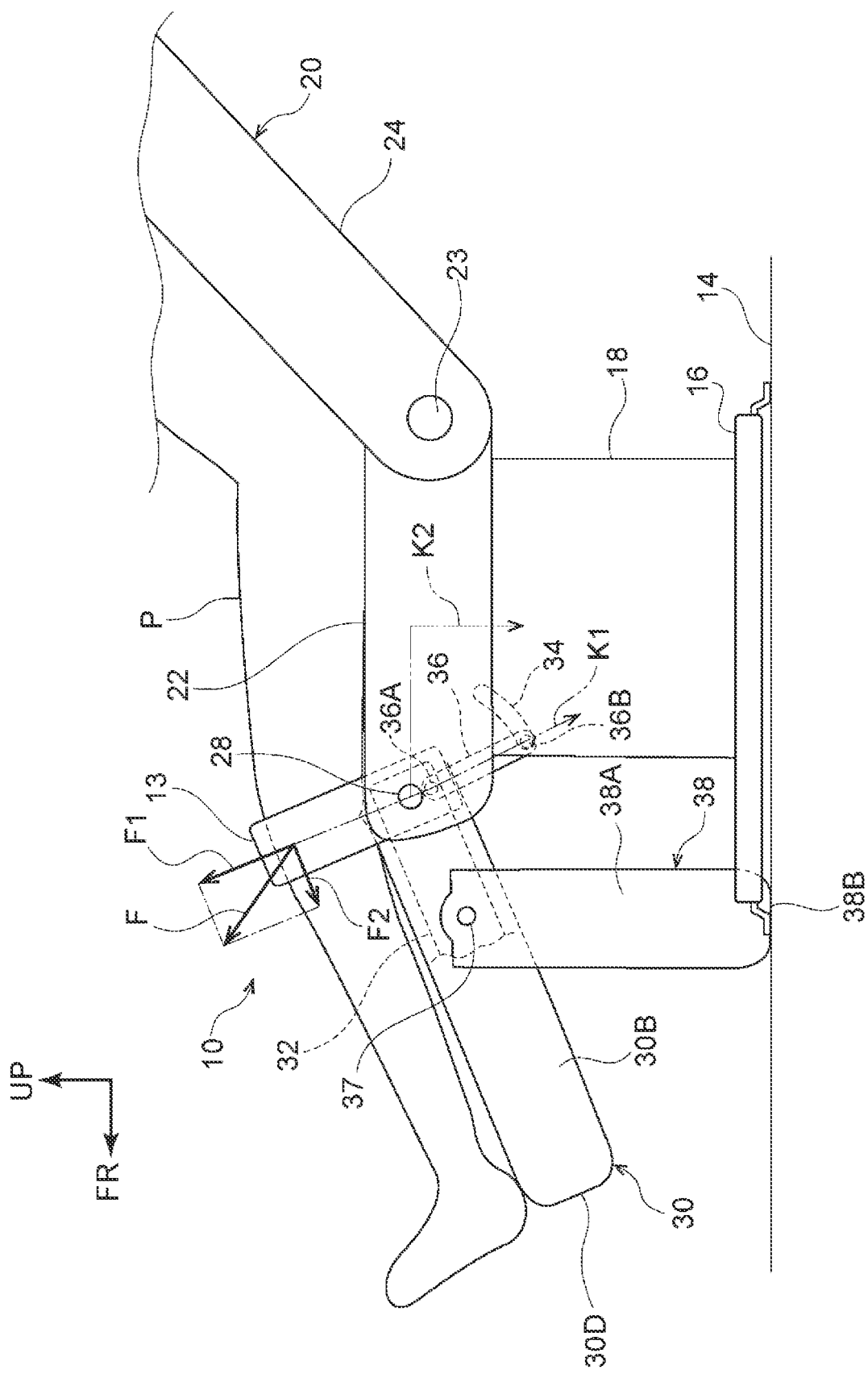
FIG. 10 is a side view of the main parts of the rear load transmission member and the front load transmission member according to the second embodiment after pivot.

As shown in FIG. 10, in the vehicle occupant restraint device 10 according to the second embodiment, a fabric restraint member 13 having a shape different from that of the fabric restraint member 12 in the first embodiment is used. That is, the fabric restraint member 13 in the second embodiment has a shape with a shorter length than the fabric restraint member 12 only in the front-rear direction, so as to mainly restrain the knees.

Both ends of the fabric restraint member 13 in the width direction are detachably attached to outer ends of the pivot shaft 28 in the axial direction. In the second embodiment, the both ends in the width direction are defined as the fixing points. Further, the fabric restraint member 13 is adapted to be manually attached by the occupant P, and its length can be adjusted. Thus, the knees (lower limbs) of the occupant P are appropriately restrained by the fabric restraint member 13.

Figure 9:
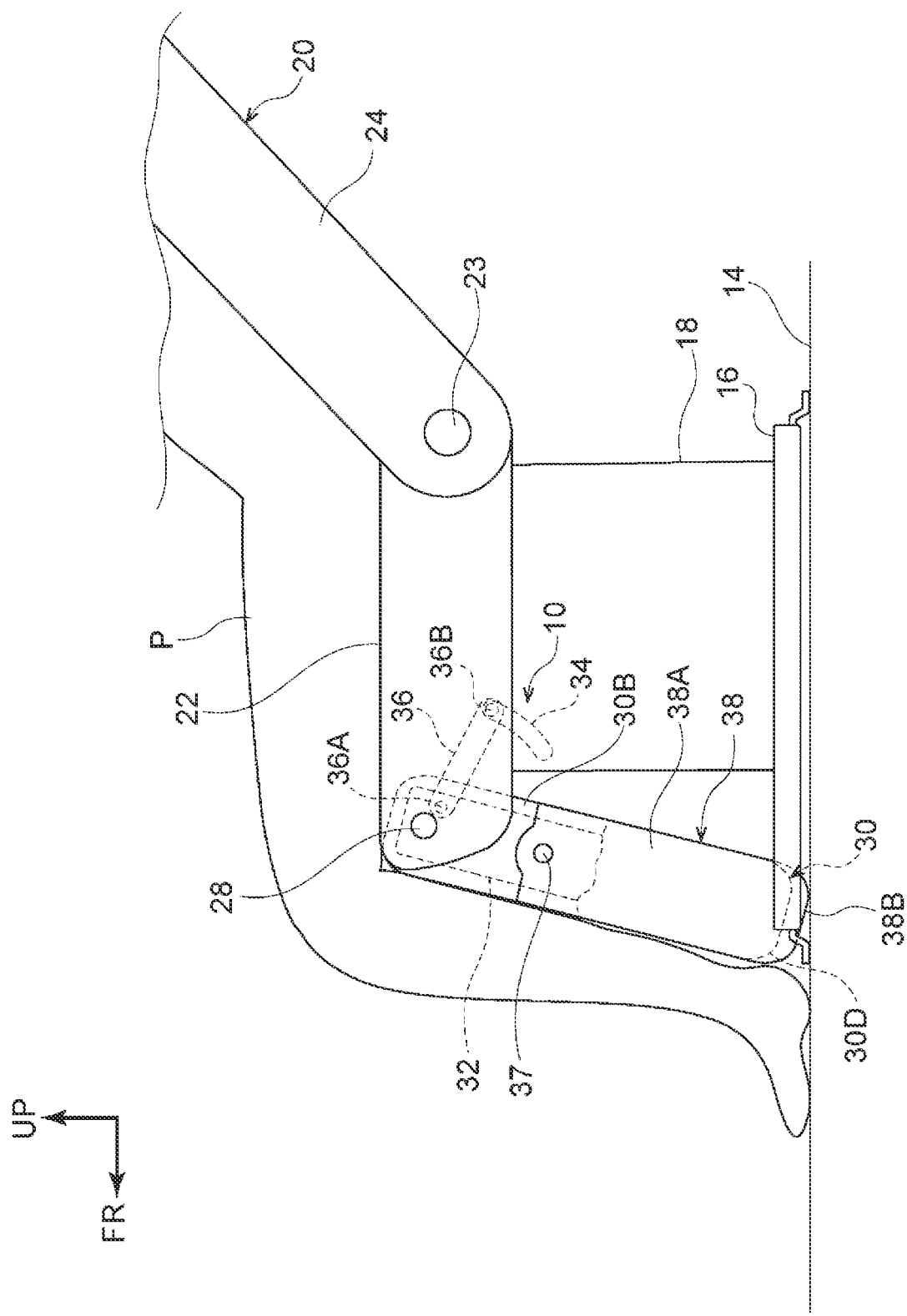
FIG. 9 is a side view of main parts of a rear load transmission member and a front load transmission member according to a second embodiment before pivot.

The load input from the occupant P to the fabric restraint member 13 at the time of a frontal collision of the vehicle is transmitted (input) to the ottoman 30. Therefore, as shown in FIGS. 9 and 10, the ottoman 30 is provided with a rear load transmission member 36 that transmits the load from the ottoman 30 to the seat frames 18 and a front load transmission member 38 that transmits the load from the ottoman 30 to the floor panel 14 (floor portion).

On both sides in the width direction inside the ottoman 30, a pair of right and left generally rectangular flat plate-shaped frames 32 with their width direction being the normal direction are embedded, and the pivot shaft 28 is rotatably supported by respective one ends of the frames 32 (the rear end of the ottoman 30, that is, the front end of the seat cushion 22). The rear load transmission member 36 is composed of a pair of right and left elongated flat plates with their width direction being the normal direction, and one end of the rear load transmission member 36 is pivotably supported by the frame 32 near the pivot shaft 28. In the following, one end of the rear load transmission member 36 pivotably supported by the frame 32 will be referred to as a pivot support portion 36A. The pivot support portion 36A is disposed close to the fixing point of the fabric restraint member 13.

A pair of right and left rails 34 is provided on the front upper portions of the seat frames 18 on the inner side in the width direction. Each rail 34 is provided along the circumference centered on the pivot support portion 36A in a side view, and the upper end thereof is extended to a position where it overlaps the side surface of the seat cushion 22. A columnar projection provided at the other end of the rear load transmission member 36 is fitted so as to be slidable along the rail 34 along with the pivot of the ottoman 30 in the up-down direction. In the following, the projection that is provided at the other end of the rear load transmission member 36 and fitted so as to be slidable along the rail 34 will be referred to as a sliding portion 36B.

The sliding portion 36B is positioned at the upper end of the rail 34 when the ottoman 30 is set in the lowered position (see FIG. 9), and is positioned at the lower end of the rail 34 when the ottoman 30 is set in the uppermost raised position (see FIG. 10). Further, when the ottoman 30 is set in the uppermost raised position, the fabric restraint member 13 and the rear load transmission member 36 are arranged substantially in parallel in a side view.

The front load transmission member 38 has a generally U-shape in a front view. That is, the front load transmission member 38 includes a pair of right and left side wall portions 38A arranged so as to face (extend along) the side surfaces 30B of the ottoman 30 when the ottoman 30 is set in the lowered position and a connecting portion 38B that integrally connects the lower ends of the side wall portions 38A and is disposed so as to face (extend along) the front end surface 30D of the ottoman 30. The width of the front load transmission member 38 is substantially the same as the thickness of the ottoman 30.

The upper end of each side wall portion 38A is pivotably connected to an intermediate portion of each frame 32 of the ottoman 30 by a pivot shaft 37. Accordingly, as shown in FIG. 10, when the ottoman 30 is raised to the uppermost raised position, the front load transmission member 38 relatively pivots downward around the pivot shaft 37 with its own weight in conjunction with the raising operation, and thus, the outer surface of the connecting portion 38B comes into contact with the upper surface of the floor panel 14.

Stoppers (not shown) for hindering the front load transmission member 38 from pivoting rearward more than necessary are provided at appropriate positions on the side surfaces 30B of the ottoman 30 or the portions of the lower surface 30C of the ottoman 30 close to the side surfaces 30B. Accordingly, the front load transmission member 38 stops at an angle perpendicular to the floor panel 14, and the entire outer surface of the connecting portion 38B can be appropriately brought into contact with the upper surface of the floor panel 14.

Next, the operation of the vehicle occupant restraint device 10 according to the second embodiment having the above configuration will be described.

As shown in FIG. 9, when the ottoman 30 is set in the lowered position, the sliding portion 36B of the rear load transmission member 36 is positioned at the upper end of the rail 34. Further, the front load transmission member 38 is disposed along the side surfaces 30B and the front end surface 30D of the ottoman 30. Here, as shown in FIG. 10, when the ottoman 30 is raised to the uppermost raised position, the fabric restraint member 13 is provided before the operation.

When the ottoman 30 is raised to the uppermost raised position, the sliding portion 36B of the rear load transmission member 36 moves toward the lower front side along the rail 34, so that the rear load transmission member 36 is set to be substantially parallel with the fabric restraint member 13 in side view. Thus, when a load F toward the upper front side is input from the knees of the occupant P moving due to inertial force to the fabric restraint member 13 at the time of a frontal collision of the vehicle, a component force F1 of the load F is transmitted from the fixing point to the pivot support portion 36A via the frame 32.

Then, the component force F1 of the load F transmitted to the pivot support portion 36A is transmitted to the sliding portion 36B via the rear load transmission member 36, and the component force F1 of the load F transmitted to the sliding portion 36B is transmitted to the seat frame 18 via the rail 34 (indicated by a virtual line K1). That is, at the time of a frontal collision of the vehicle, the load input from the knees of the occupant P moving due to inertial force to the fabric restraint member 13 is efficiently distributed to the highly rigid seat frames 18. As a result, the strength and the rigidity of the ottoman 30 are improved.

More specifically, when the rear load transmission member 36 is not provided, the component force F1 of the load F input to the fixing point is transmitted a seat cushion frame (not shown) provided inside the seat cushion 22 and transmitted from the seat cushion frame to the seat frame 18 (indicated by a virtual line K2). That is, the component force F1 of the load F is transmitted from the fixing point to the rear side and then to the lower side (bent and transmitted).

In contrast, when the rear load transmission member 36 is provided, the component force F1 of the load F is transmitted from the fixing point to the seat frame 18 via the rear load transmission member 36. That is, since the pivot support portion 36A of the rear load transmission member 36 is disposed close to the fixing point of the fabric restraint member 13, the component force F1 of the load F is linearly transmitted obliquely rearward and downward from the fixing point (indicated by the virtual line K1).

Therefore, as compared with the case where the rear load transmission member 36 is not provided, the component force F1 of the load F input from the knees of the occupant P to the fixing points of the fabric restraint member 13 can be effectively transmitted to the seat frames 18 and efficiently dispersed. As described above, according to the second embodiment, the strength and the rigidity of the ottoman 30 can be eventually improved with the simple configuration, and the occupant P is efficiently restrained by the fabric restraint member 13.

On the other hand, when the ottoman 30 is raised to the uppermost raised position, the front load transmission member 38 pivots downward around the pivot shaft 37 due to its own weight, and the outer surface of the connecting portion 38B (particularly a corner portion that is a boundary portion between the side wall portion 38A and the connecting portion 38B) is brought into contact with the upper surface of the floor panel 14. That is, the front load transmission member 38 is set at an angle perpendicular to the floor panel 14 with its downward pivot position restricted by the stopper.

Therefore, at the time of a frontal collision of the vehicle, a component force F2 of the load F input from the knees of the occupant P moving due to the inertial force to the fabric restraint member 13 is transmitted from the frame 32 of the ottoman 30 to the front load transmission member 38 and transmitted from the front load transmission member 38 to the floor panel 14. Thus, the front load transmission member 38 also has a simple structure like the rear load transmission member 36, but can eventually improve the strength and the rigidity of the ottoman 30.

Even when a load toward the lower front side is input to the seat cushion 22 from the occupant P moving due to the inertial force and the seat cushion 22 attempts to fall toward the lower front side, the front load transmission member 38 can suppress and reduce the falling toward the lower front side. That is, with the front load transmission member 38, it is possible to effectively suppress or reduce the occurrence of a so-called submarine phenomenon with respect to the occupant P.

Third Embodiment

Finally, a third embodiment will be described. The same parts as those in the first embodiment and the second embodiment are designated by the same reference signs, and detailed description thereof will be omitted as appropriate.

Figure 11:
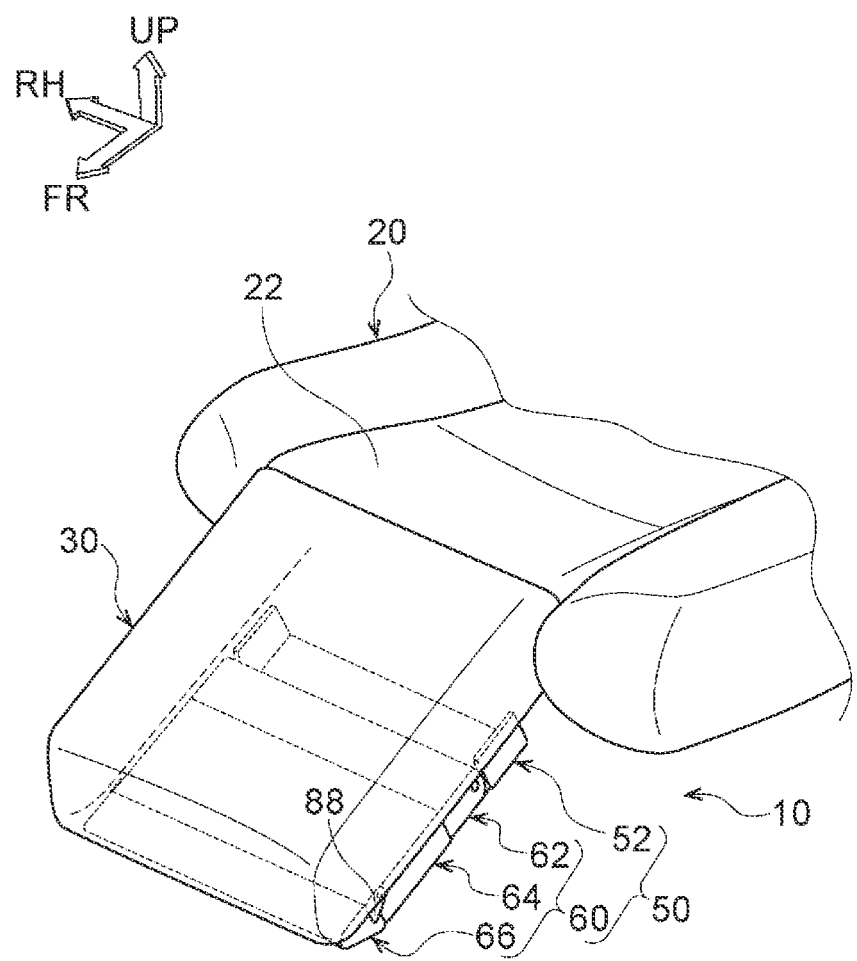
FIG. 11 is a perspective view showing an ottoman provided with a toe restraint device according to a third embodiment.
Figure 13:
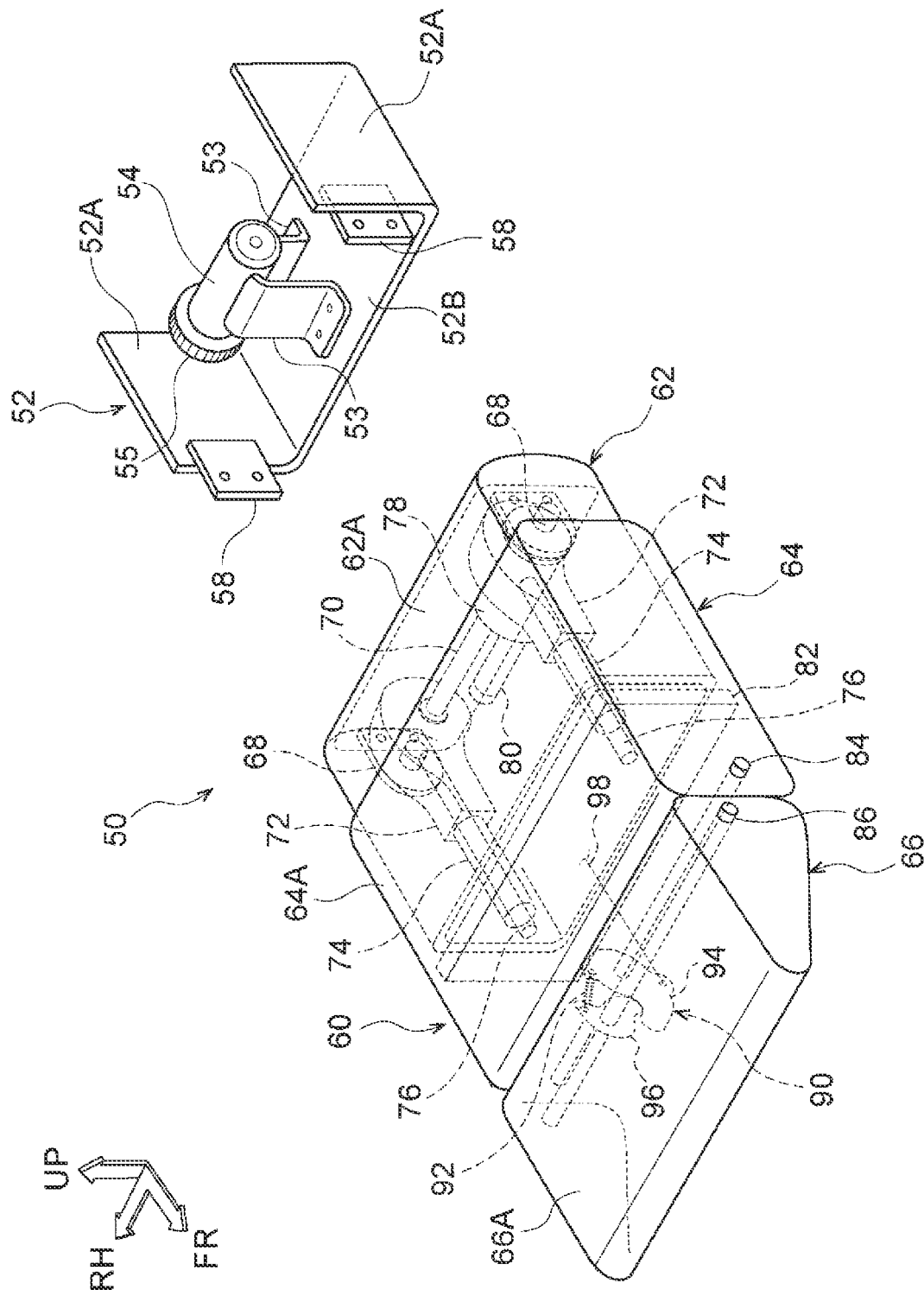
FIG. 13 is a perspective view showing a partially disassembled toe restraint device according to the third embodiment.

As shown in FIG. 11, in the vehicle occupant restraint device 10 according to the third embodiment, a toe restraint device 50 is provided on the lower surface 30C of the ottoman 30. As shown in FIG. 13, the toe restraint device 50 includes a toe restraint member 60 and a moving unit 52. The toe restraint member projects upward from the front side of the ottoman 30 and restrains toes Pf of the occupant P (see FIG. 17) when at least the ottoman 30 is set in the raised position and the seat back 24 takes a comfortable posture. The moving unit 52 supports the toe restraint member 60 and moves the toe restraint member 60 in the front-rear direction along the lower surface 30C of the ottoman 30.

Figure 12:
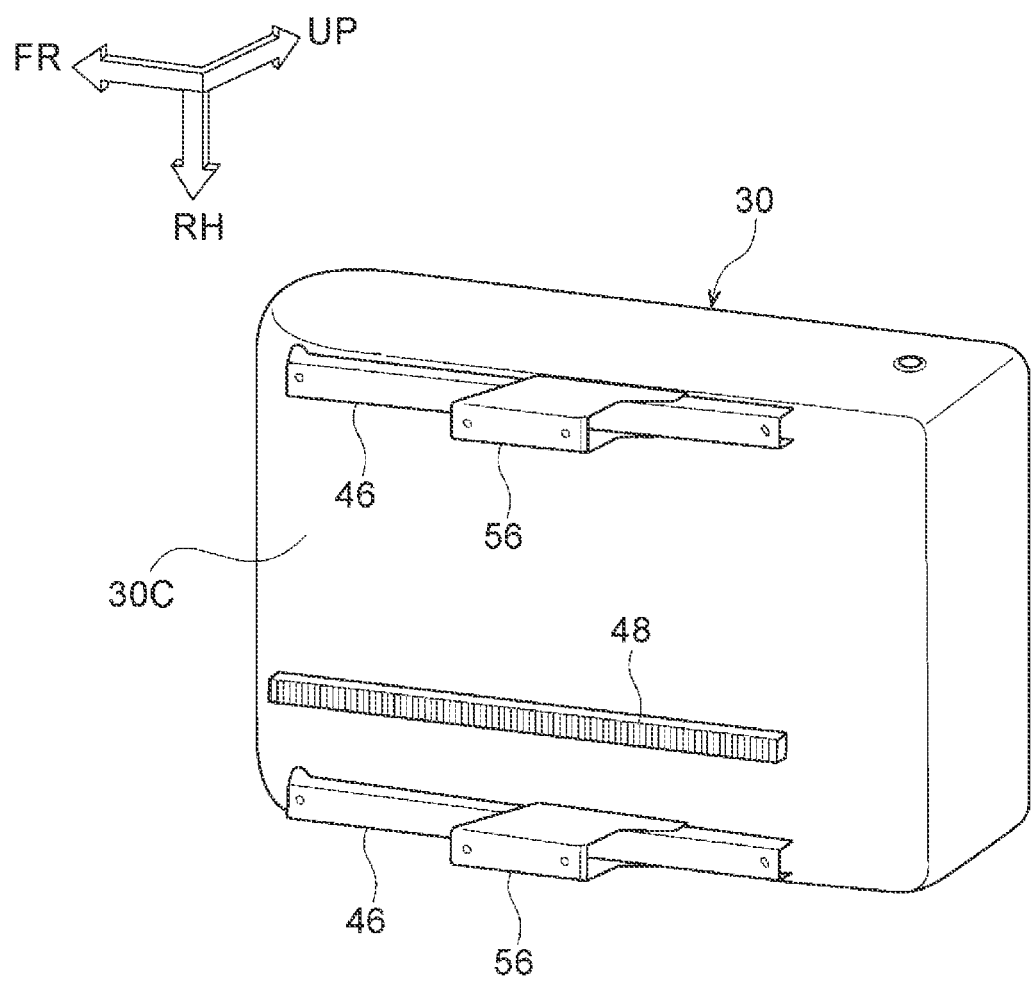
FIG. 12 is a perspective view showing a lower surface of the ottoman provided with the toe restraint device according to the third embodiment.

As shown in FIG. 12, guide rails 46 extending in the front-rear direction are attached to the opposite ends of the lower surface 30C of the ottoman 30 in the width direction. The guide rails 46 shown in FIG. 12 are each slidably fitted with a guide member 56 provided on the moving unit 52. That is, the guide member 56 provided to both side walls 52A is omitted from the moving unit 52 shown in FIG. 13. Further, a rack 48 extending in the front-rear direction is fixed at a predetermined position on the lower surface 30C of the ottoman 30.

As shown in FIG. 13, the moving unit 52 has a generally U-shape in a front view, and includes the side walls 52A and a connecting portion 52B that integrally connects the lower ends of the side walls 52A. A motor 54 is provided on the upper surface of the connecting portion 52B via a pair of front and rear support members 53, and a pinion 55 that meshes with the rack 48 is coaxially provided on the rotation shaft (not shown) of the motor 54.

Further, generally rectangular flat plate-shaped brackets 58 for attaching the toe restraint member 60 are attached to the front ends of the side walls 52A. The guide members 56 are attached to the inner surfaces of the side walls 52A facing each other in the width direction. As described above, the guide members 56 are shown in FIG. 12 in a state where the guide members 56 are slidably fitted with the guide rails 46 provided on the lower surface 30C of the ottoman 30, and illustration of the guide members 56 is omitted in FIG. 13.

Figure 14:
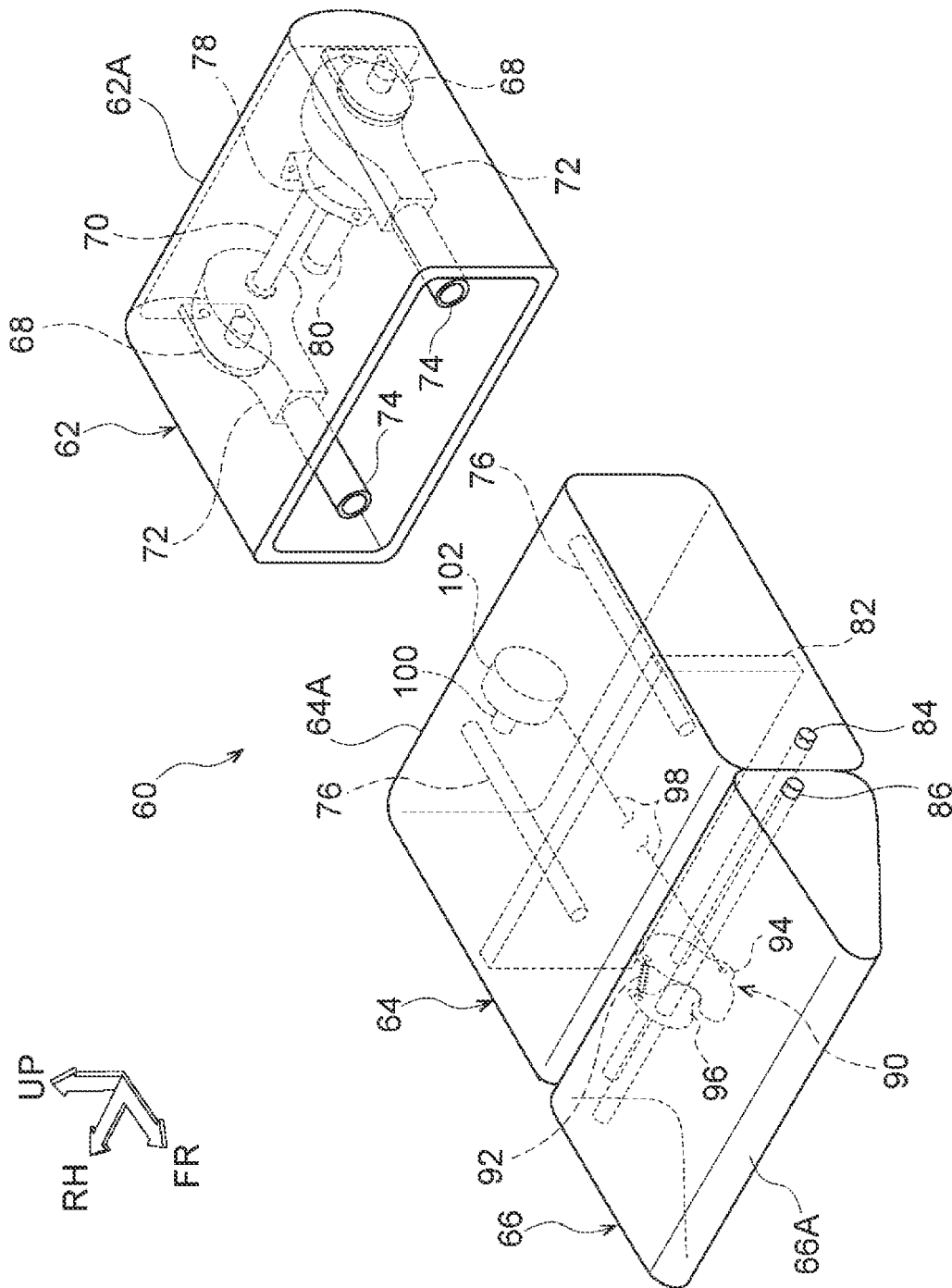
FIG. 14 is a perspective view showing a partially disassembled toe restraint member of the toe restraint device according to the third embodiment.
Figure 15:
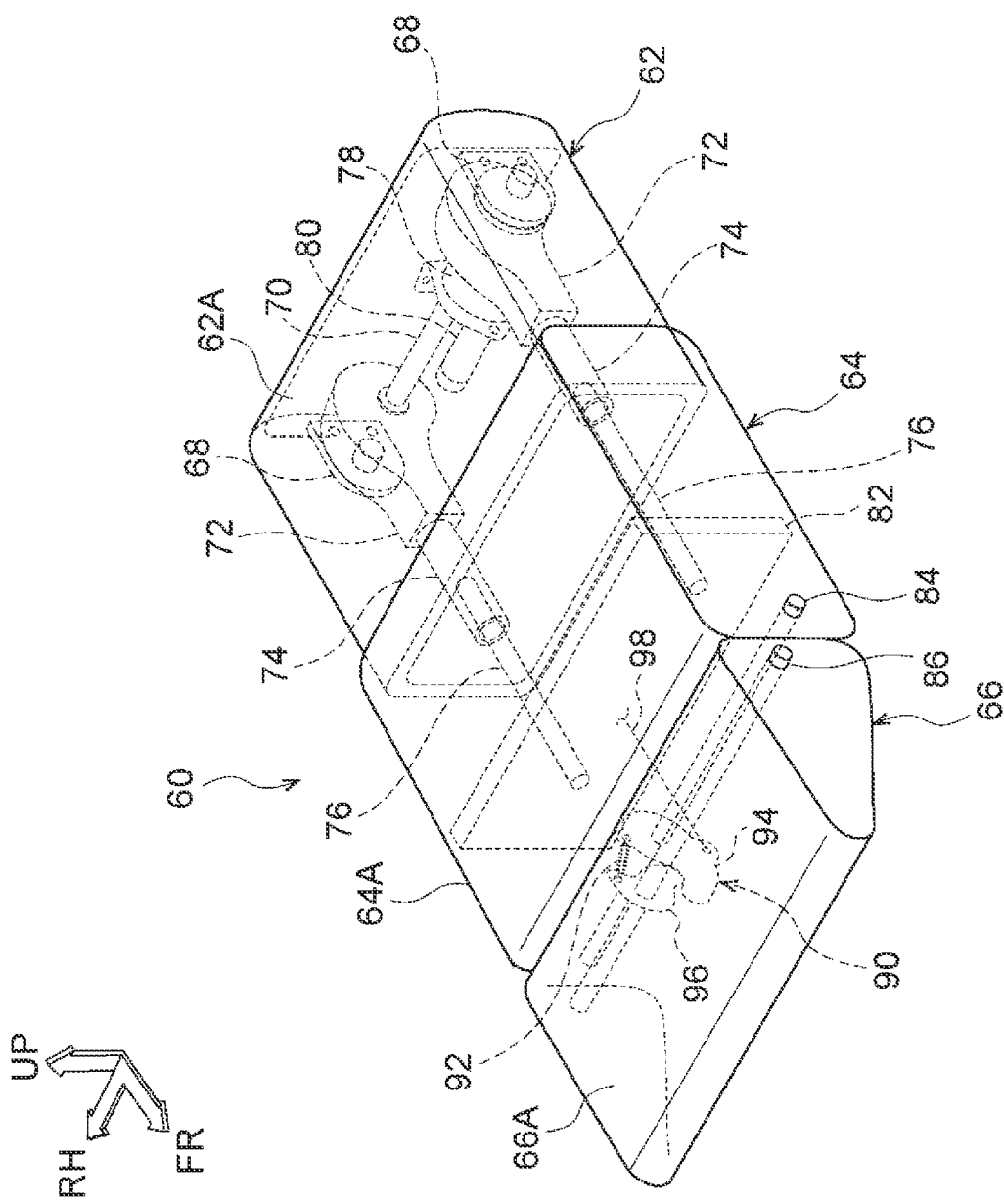
FIG. 15 is a perspective view showing the toe restraint member of the toe restraint device according to the third embodiment.

As shown in FIGS. 13 to 15, the toe restraint member 60 includes a base portion 62, a slide portion 64, and a toe portion 66. The base portion 62 is attached to the moving unit 52 and is configured to be pivotable with respect to the moving unit 52. The slide portion 64 covers the base portion 62 from the front outer side and is provided so as to be slidable in the front-rear direction with respect to the base portion 62. The toe portion 66 is provided at the front end of the slide portion 64 so as to be pivotable with the width direction being an axial direction.

The base portion 62 includes a housing-shaped body portion 62A that is open in the front-rear direction. A rotation shaft 70 is rotatably supported at the rear end of the inside of the body portion 62A via a pair of right and left brackets 68. The rear ends of the brackets 68 are attached to the front ends of the brackets 58. Inside the body portion 62A, a pair of right and left holders 72 are fixed to the opposite ends of the rotation shaft 70 in the axial direction, and the front end of each holder 72 is integrally provided with a cylindrical rod holding portion 74 for accommodating a rod 76 described later such that the rod 76 is extendable and retractable.

A motor 80 and a gearbox 78 are provided inside the body portion 62A, and a rotational driving force from the motor 80 is transmitted to the rotation shaft 70 via gears (not shown) in the gearbox 78. Thus, when the motor 80 is rotationally driven, the holders 72 rotate around the rotation shaft 70, and the base portion 62 (body portion 62A) pivots with respect to the moving unit 52.

The slide portion 64 includes a housing-like body portion 64A having such a size as to accommodate the base portion 62 inside and having its rear side that is open. A pair of right and left columnar rods 76 is provided inside the body portion 64A with a predetermined interval between the rods 76 in the width direction (interval corresponding to the interval between the rod holding portions 74). Specifically, respective one ends (front ends) of the rods 76 are fixed to a generally rectangular flat plate-shaped plate 82, and the plate 82 is fixed to the front side inside the body portion 64A.

The other ends (rear ends) of the rods 76 are each configured to be inserted into the rod holding portion 74. The amount of extension and retraction of the rod 76 with respect to the rod holding portion 74 is adjusted by an electric drive device (not shown) provided in the holder 72. Thereby, the slide portion 64 slides with respect to the base portion 62. That is, the length of the toe restraint member 60 can be adjusted by electric power in accordance with the size of the foot of the occupant P.

As will be described later, when the slide portion 64 slides in a direction of retracting corresponding to the size of the foot of the occupant P and the toe Pf of the occupant P contacts (interferes with) the toe portion 66, the slide is forcibly stopped and the slide portion 64 slides in a direction of extending to some extent. That is, the electric drive device provided in each holder 72 is provided with a safety function such as a pressure sensor (not shown) that suppresses the toe portion 66 from excessively interfering with the toe Pf of the occupant P.

Further, a rotation shaft 84 having its axial direction extending in the width direction is provided at the front end of the body portion 64A of the slide portion 64, and the opposite ends of the rotation shaft 84 in the axial direction protrude from the body portion 64A. A connecting plate 88 (see FIGS. 11 and 17) is provided at respective front ends of the side surfaces of the body portion 64A in the width direction, and the opposite ends of the rotation shaft 84 in the axial direction protruding from the body portion 64A are rotatably supported by respective ends (rear ends) of the connecting plates 88.

The toe portion 66 includes a generally triangular columnar body portion 66A having a generally right-angled triangular shape in a side view, and is pivotably supported on the front side of the slide portion 64. That is, a rotation shaft 86 having its axial direction extending in the width direction is fixed at the rear end of the body portion 66A, and the opposite ends of the rotation shaft 86 in the axial direction protrude from the body portion 66A. The opposite ends of the rotation shaft 86 in the axial direction protruding from the body portion 66A are pivotably supported by the other ends (front ends) of the connecting plates 88.

Further, as shown in FIGS. 13 to 16B, a cam mechanism 90 is provided between the axially central portion of the rotation shaft 84 and the axially central portion of the rotation shaft 86. The cam mechanism 90 includes a first cam 94 and a second cam 96. The first cam 94 is pivotably provided around the rotation shaft 84 as the rotation shaft 84 is inserted into a through hole 94A (see FIGS. 16A and 16B). The second cam 96 pivots with the rotation shaft 86 as the rotation shaft 86 is inserted into and fixed to a through hole 96A (see FIGS. 16A and 16B).

Figure 16A:
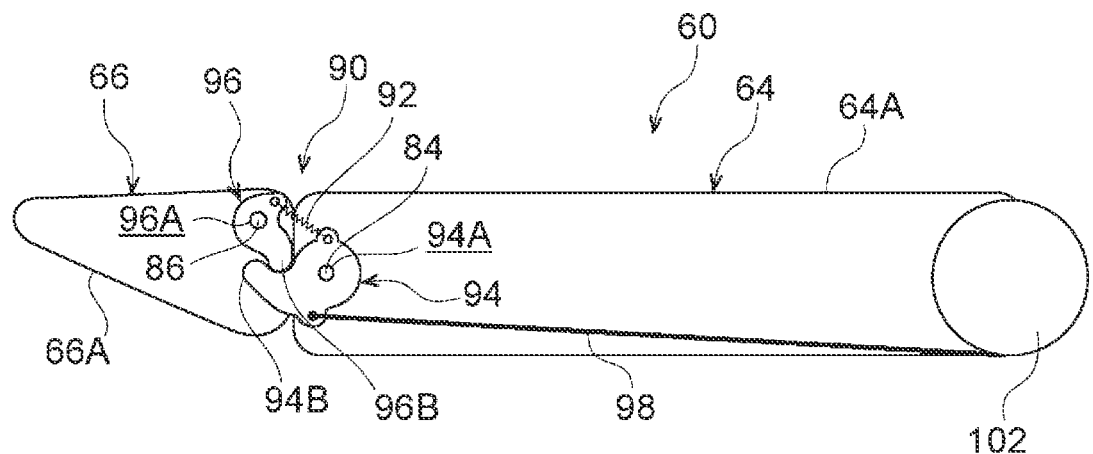
FIG. 16A is a side view showing the toe restraint member according to the third embodiment before pivot of a toe portion.
Figure 16B:
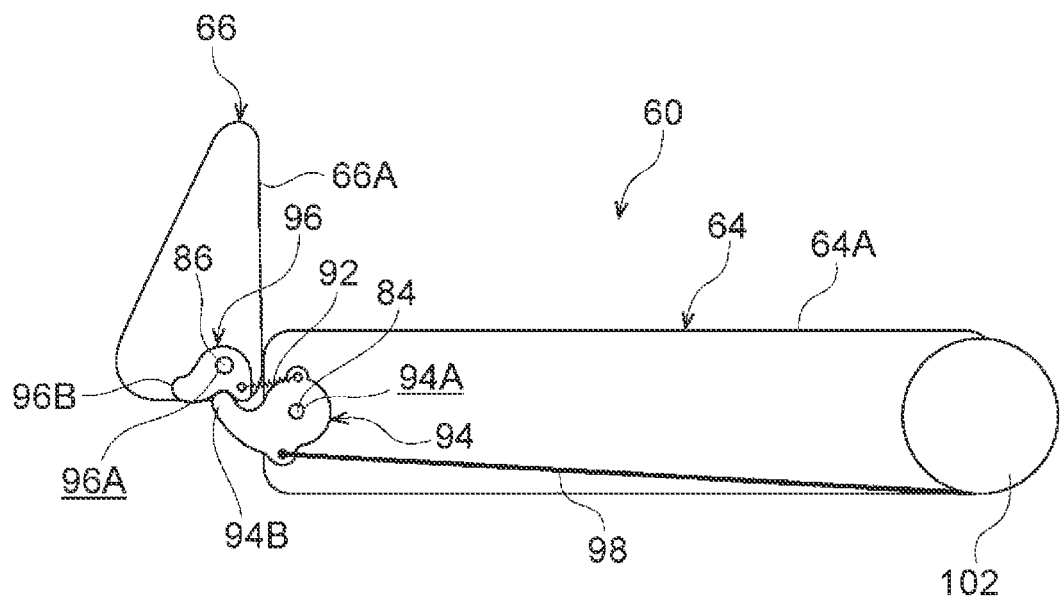
FIG. 16B is a side view showing the toe restraint member according to the third embodiment after pivot of the toe portion.

The first cam 94 is always urged to rotate in the clockwise direction in FIGS. 16A and 16B by an urging member such as a torsion spring (not shown) provided on the rotation shaft 84. The front end of the first cam 94 is defined as a locking portion 94B that protrudes toward the upper front side (clockwise direction). Further, the lower end of the second cam 96 is defined as a locked portion 96B that is locked by the locking portion 94B from the lower side. The locked portion 96B is configured to be released from the locking portion 94B as the first cam 94 is pulled by a wire 98 described later to rotate in the counterclockwise direction in FIGS. 16A and 16B.

The cam mechanism 90 includes a tension coil spring (hereinafter simply referred to as "coil spring") 92. One end of the coil spring 92 is attached to the upper end of the first cam 94 (above the rotation center) and the other end of the coil spring 92 is attached to the upper end of the second cam 96 (above the rotation center). Thus, the first cam 94 and the second cam 96 are configured to be urged by the coil spring 92 so as to rotate in the opposite directions.

Further, the cam mechanism 90 includes a wire 98. One end of the wire 98 is attached to the lower end of the first cam 94 (below the rotation center). The other end of the wire 98 is attached to a wind-up shaft 102 provided at the rear end of the slide portion 64, as shown in FIGS. 14, 16A, and 16B. The wind-up shaft 102 (omitted in FIGS. 13 and 15) is provided inward of the right and left rods 76 in the width direction, and is driven by a motor 100 coaxially provided on the wind-up shaft 102 to rotate so as to wind up the wire 98.

Here, the pivot operation of the toe portion 66 will be described. When the wind-up shaft 102 is rotated by the driving of the motor 100 and the wire 98 is wound around the wind-up shaft 102 by a predetermined length, the first cam 94 rotates around the rotation shaft 84 in the counterclockwise direction in FIG. 16A to release the locked portion 96B from the locking portion 94B.

Since the second cam 96 is urged in the clockwise direction in FIGS. 16A and 16B by the coil spring 92, the second cam 96 rotates in the clockwise direction. That is, the rotation shaft 86 rotates in the clockwise direction, and the body portion 66A of the toe portion 66 to which the rotation shaft 86 is fixed rotates by approximately 90 degrees in the clockwise direction. As a result, as shown in FIG. 16B, the toe portion 66 is set so as to be substantially perpendicular to the slide portion 64 (such that the toe portion 66 is standing upright).

As shown in FIG. 16B, after the toe portion 66 has rotated by approximately 90 degrees, the energization of the motor 100 is cut off, so that the wind-up shaft 102 can rotate freely. Thereby, the first cam 94 rotates in the clockwise direction in FIGS. 16A and 16B with the urging force of the urging member such as the torsion spring, and the locking portion 94B contacts the lower end of the second cam 96 at a predetermined pressure. As a result, the toe portion 66 is suppressed from inadvertently pivoting in the counterclockwise direction.

Further, the toe portion 66 is returned to its original position when the toe restraint member 60 is stored in the lower surface 30C of the ottoman 30. That is, when the toe restraint member 60 moves toward the seat cushion 22 on the lower surface 30C of the ottoman 30, the toe portion 66 standing upright is pushed forward by the front end of the ottoman 30. Then, the locked portion 96B of the second cam 96 pushes the locking portion 94B of the first cam 94 downward against the urging force of the urging member such as the torsion spring and rides over the locking portion 94B, and finally is locked to the locking portion 94B as shown in FIG. 16A.

Next, the operation of the vehicle occupant restraint device 10 according to the third embodiment having the above configuration will be described.

Figure 21:
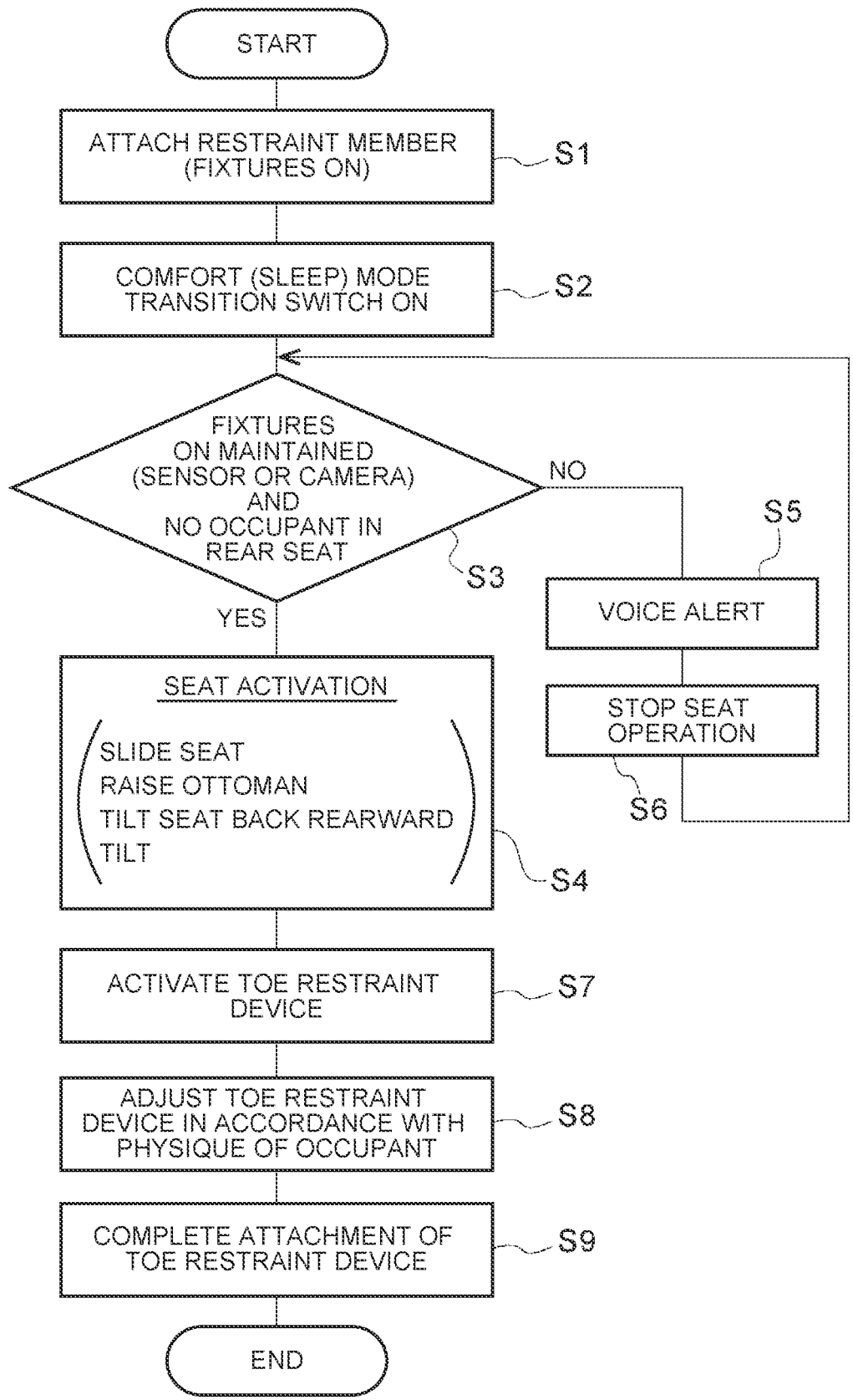
FIG. 21 is a flowchart showing operations of the vehicle occupant restraint device provided with the toe restraint device according to the third embodiment.

As shown in FIG. 21, the operation until the ottoman 30 is set in the raised position is the same as that in the first embodiment (steps S1 to S6). Although not shown in the third embodiment, the restraint member capable of restraining the lower limbs including the knees of the occupant P may be the fabric restraint member 12 in the first embodiment or the fabric restraint member 13 in the second embodiment.

Figure 17:
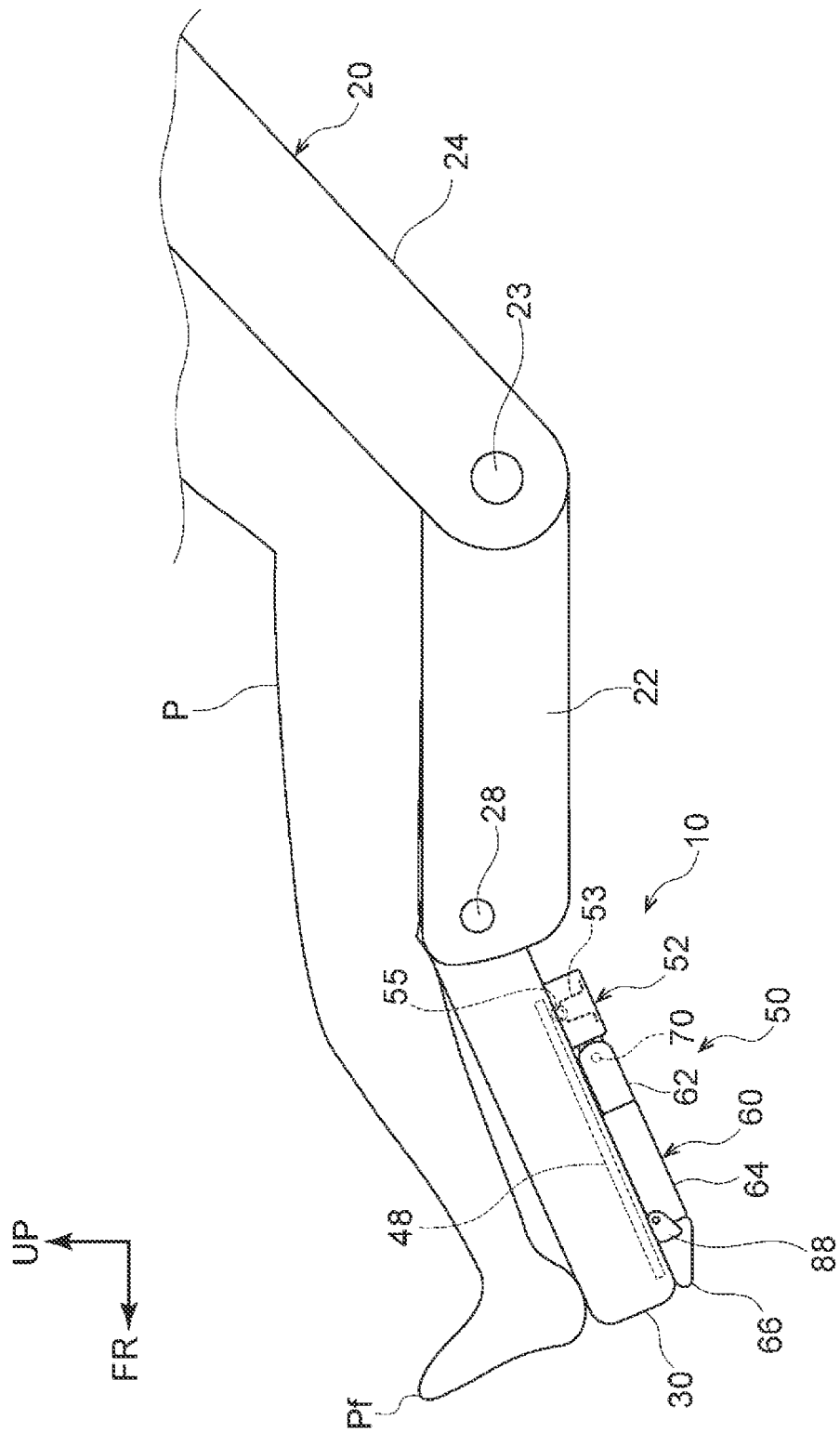
FIG. 17 is a side view showing the toe restraint device according to the third embodiment before operation.

For using the toe restraint device 50 after the ottoman 30 is set in the raised position, a switch (not shown) provided in the vehicle cabin is operated. Then, as shown in FIG. 17, the moving unit 52 of the toe restraint device 50 set in the retracted position on the lower surface 30C of the ottoman 30 moves forward (operates) (step S7).

Figure 18:
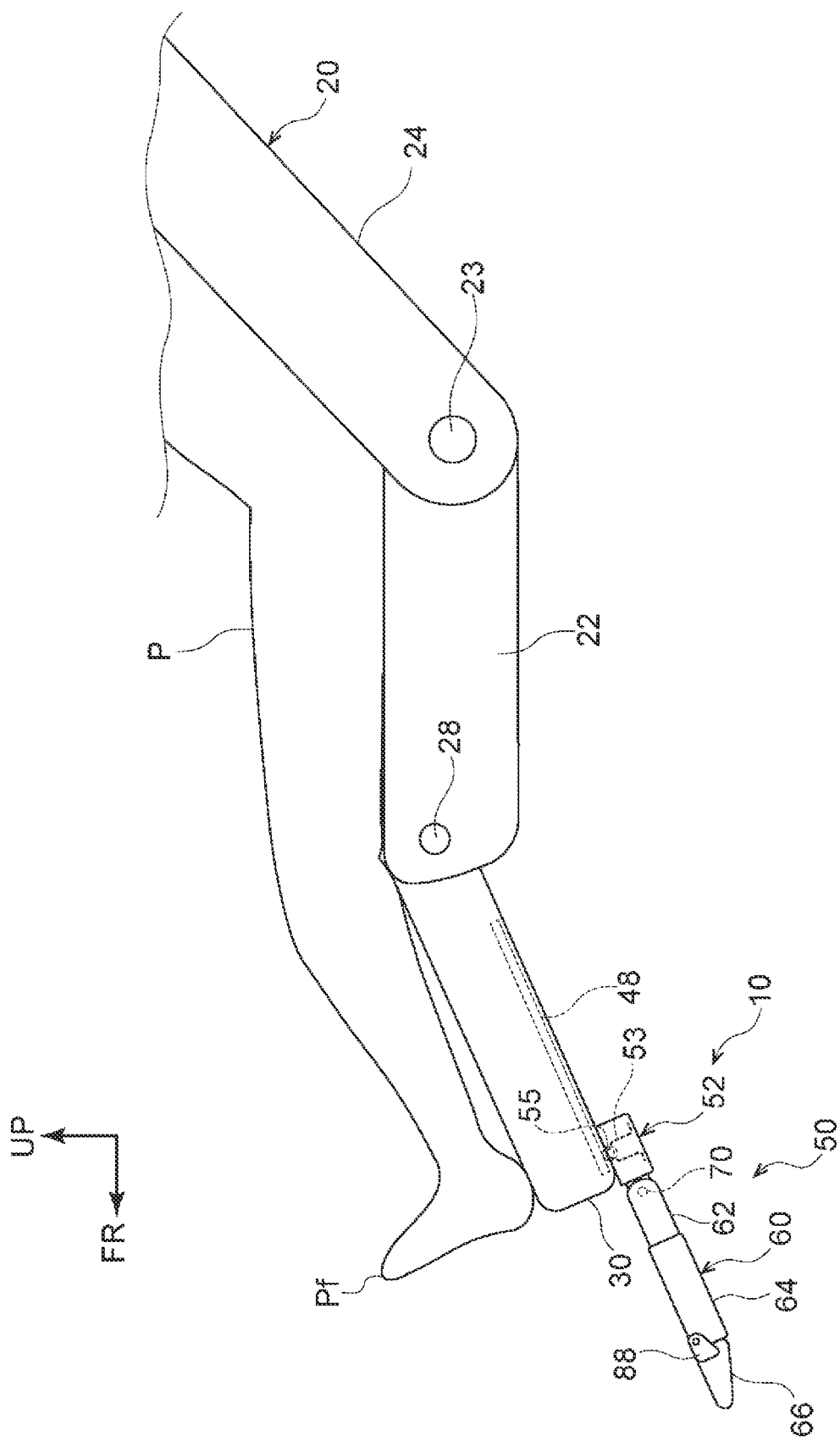
FIG. 18 is a side view showing the toe restraint device according to the third embodiment in operation before the toe restraint member pivots.

That is, when the motor 54 of the moving unit 52 is driven, the pinion 55 rotates, and the moving unit 52 in which the guide members 56 are supported by the guide rails 46 moves forward along the rack 48. Then, as shown in FIG. 18, when the moving unit 52 reaches the front end of the ottoman 30, the motor 80 is driven and the toe restraint member 60 rotates upward around the rotation shaft 70. That is, the toe restraint member 60 projects upward from the front side of the ottoman 30 (see FIG. 19).

Figure 19:
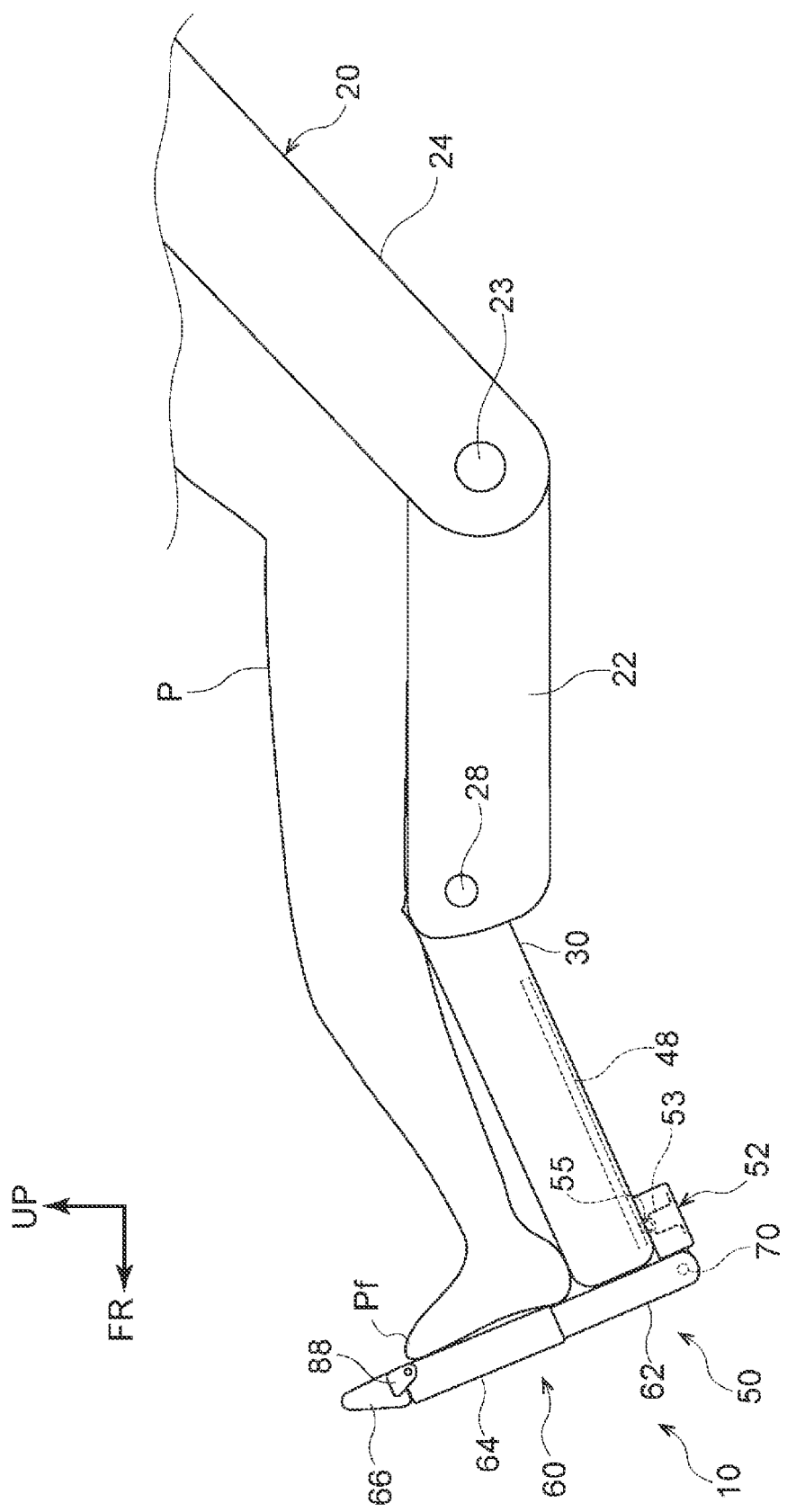
FIG. 19 is a side view showing the toe restraint device according to the third embodiment in operation after the toe restraint member is extended.

After that, the rods 76 protrude from the rod holding portions 74 with driving of the electric drive devices provided in the holders 72. That is, as shown in FIG. 19, the slide portion 64 slides upward with respect to the base portion 62. Then, when the slide portion 64 slides to an appropriate position, the wind-up shaft 102 is rotated by driving of the motor 100 to wind up the wire 98.

Figure 20:
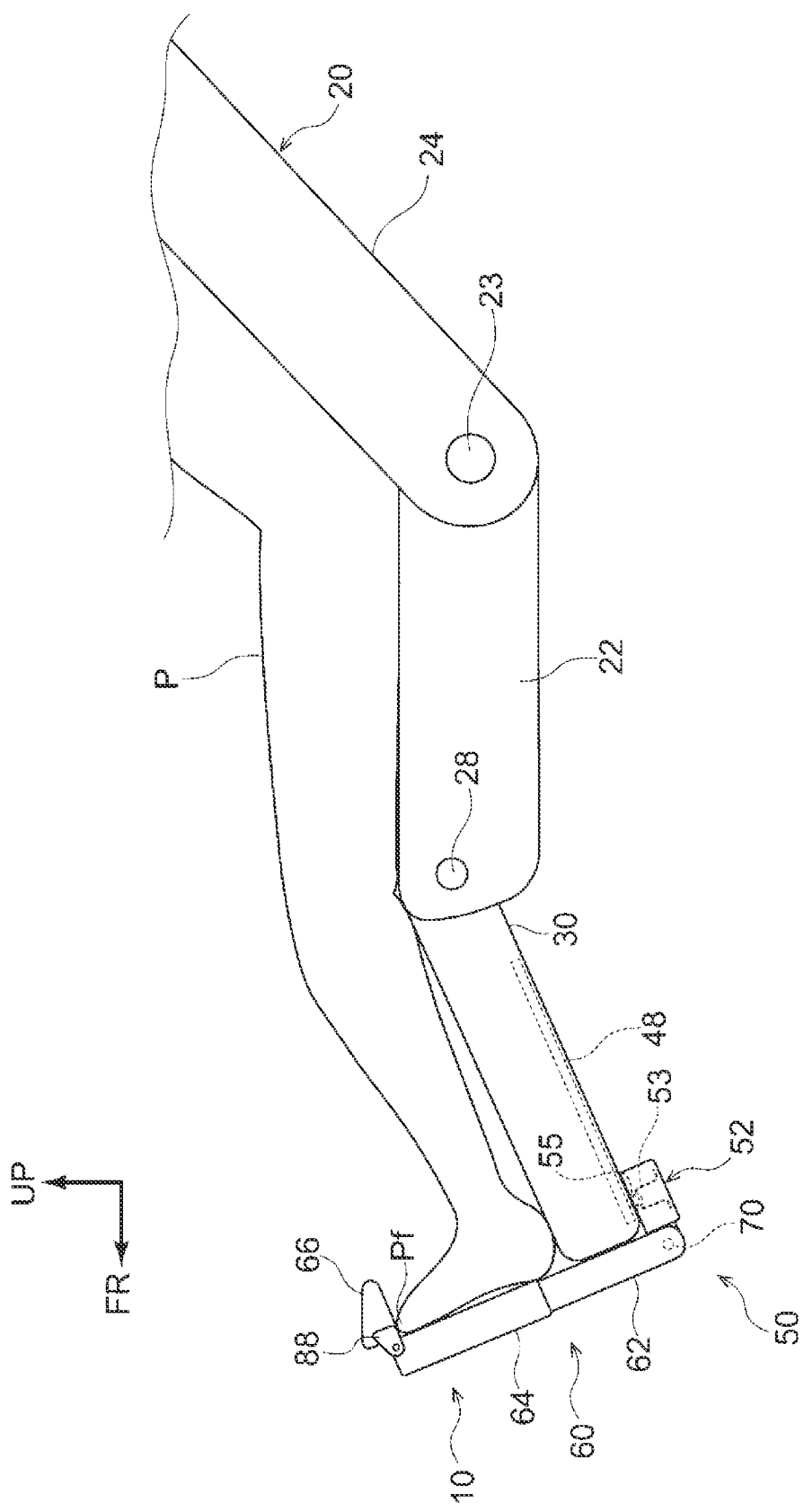
FIG. 20 is a side view showing the toe restraint device according to the third embodiment after operation.

The first cam 94 of the cam mechanism 90 rotates around the rotation shaft 84, the locked portion 96B of the second cam 96 is released from the locking portion 94B, and the second cam 96 rotates in the direction opposite to the rotation direction of the first cam 94 with the urging force of the coil spring 92. As a result, the toe portion 66 rotates by approximately 90 degrees, and as shown in FIG. 20, the toe portion 66 is set in an upright state so as to be substantially perpendicular to the slide portion 64.

After the toe portion 66 has rotated by approximately 90 degrees, the energization of the motor 100 is cut off, and the wind-up shaft 102 can rotate freely. Accordingly, the first cam 94 rotates in the same direction as the second cam 96 to the position where the first cam 94 is in the original posture with the urging force of the urging member such as the torsion spring, and the locking portion 94B stops the second cam 96 with the urging force. Thus, it is possible to suppress or reduce the toe portion 66 from inadvertently pivoting to the original position, and it is possible to maintain the upright state of the toe portion 66.

Thereafter, when a pressure sensor detects that the slide portion 64 slides in a direction of retracting corresponding to the size of the foot of the occupant P and the toes Pf of the occupant P contact (interfere with) the toe portion 66, the slide is forcibly stopped and the slide portion 64 slides in a direction of extending by 10 mm, for example. In this way, the length of the toe restraint member 60 is electrically adjusted in accordance with the size of the foot (physique) of the occupant P (step S8). Thus, attachment of the toe restraint device 50 is completed (step S9).

Thus, even if the vehicle is involved in a frontal collision while the ottoman 30 is held in the raised position, the toe portion 66 can effectively suppress or reduce the toe Pf side of the occupant P from being flipped upward by inertial force. As a result, the restraint performance of the fabric restraint member 12 (or the fabric restraint member 13) on the knees can be enhanced.

That is, the lower body (at least one of the waist and the lower legs) of the occupant P moving forward due to inertial force at the time of a frontal collision of the vehicle can be appropriately received by the fabric restraint member 12 (or the fabric restraint member 13). Thereby, it is possible to effectively suppress or reduce the occurrence of a so-called submarine phenomenon with respect to the occupant P.

Thus, according to the third embodiment, it is possible to appropriately restrain the lower limbs of the occupant P in a comfortable posture and accurately suppress the behavior of the occupant P, without increasing the strength and the rigidity of the ottoman 30 and regardless of the size of the foot (physique) of the occupant P, at the time of a frontal collision of the vehicle.

When the toe restraint member 60 is stored, the feet of the occupant P are moved off the toe restraint member 60. Then, a switch (not shown) provided in the vehicle cabin is operated. Then, the electric drive device drives the slide portion 64 to slide in the retracting direction, and thereafter the motor 80 drives the toe restraint member 60 to pivot downward around the rotation shaft 70.

Subsequently, the pinion 55 is rotated by driving of the motor 54, and the moving unit 52 moves toward the seat cushion 22 along the rack 48 and the guide rails 46. Along with the movement, the toe portion 66 standing upright contacts the front end of the ottoman 30 and pivots to return to its original position. As a result, the toe restraint device 50 is stored in the storage position as shown in FIG. 17.

Figure 22:
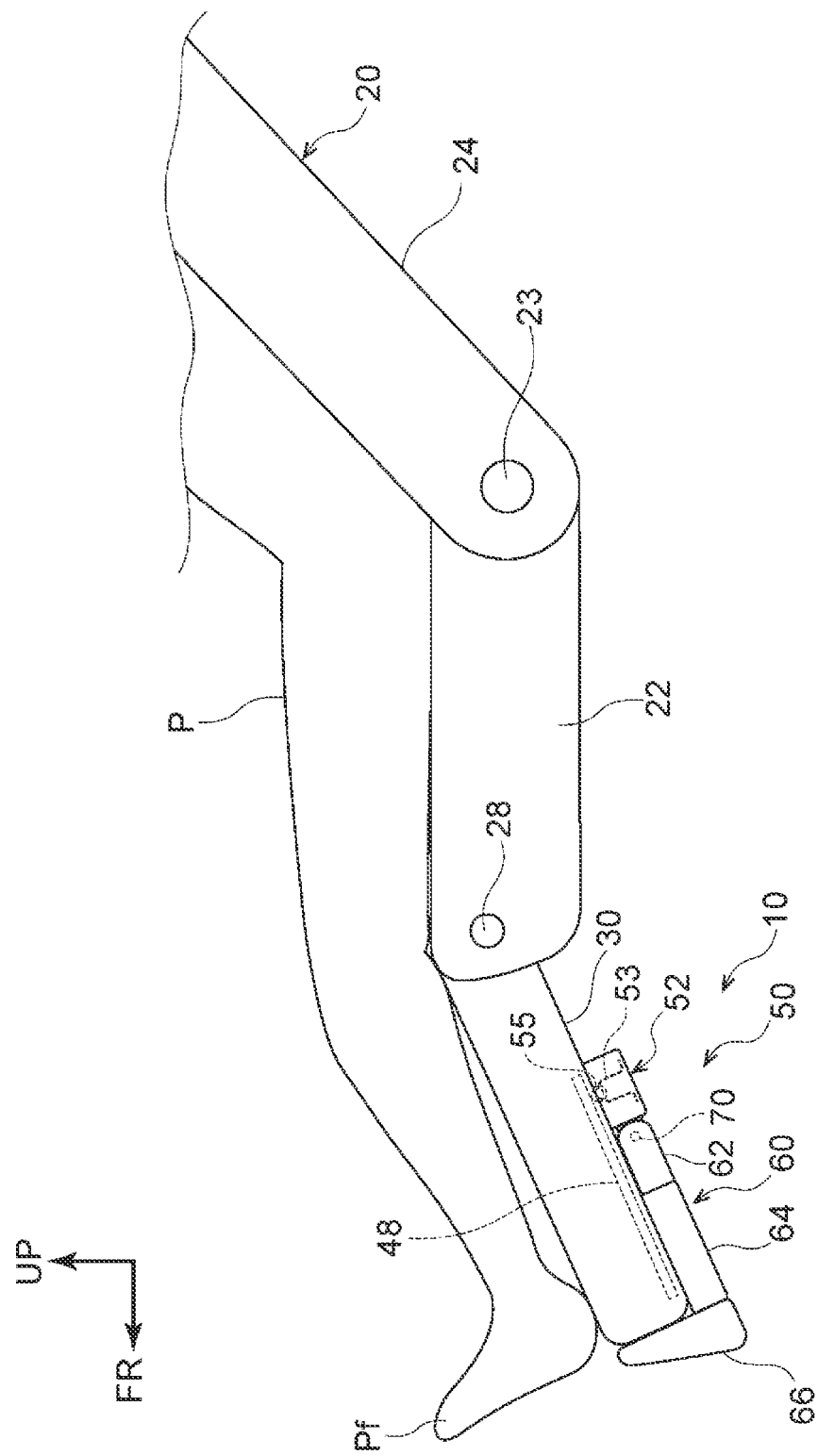
FIG. 22 is a side view showing the toe restraint device according to a modification of the third embodiment before operation.
Figure 23:
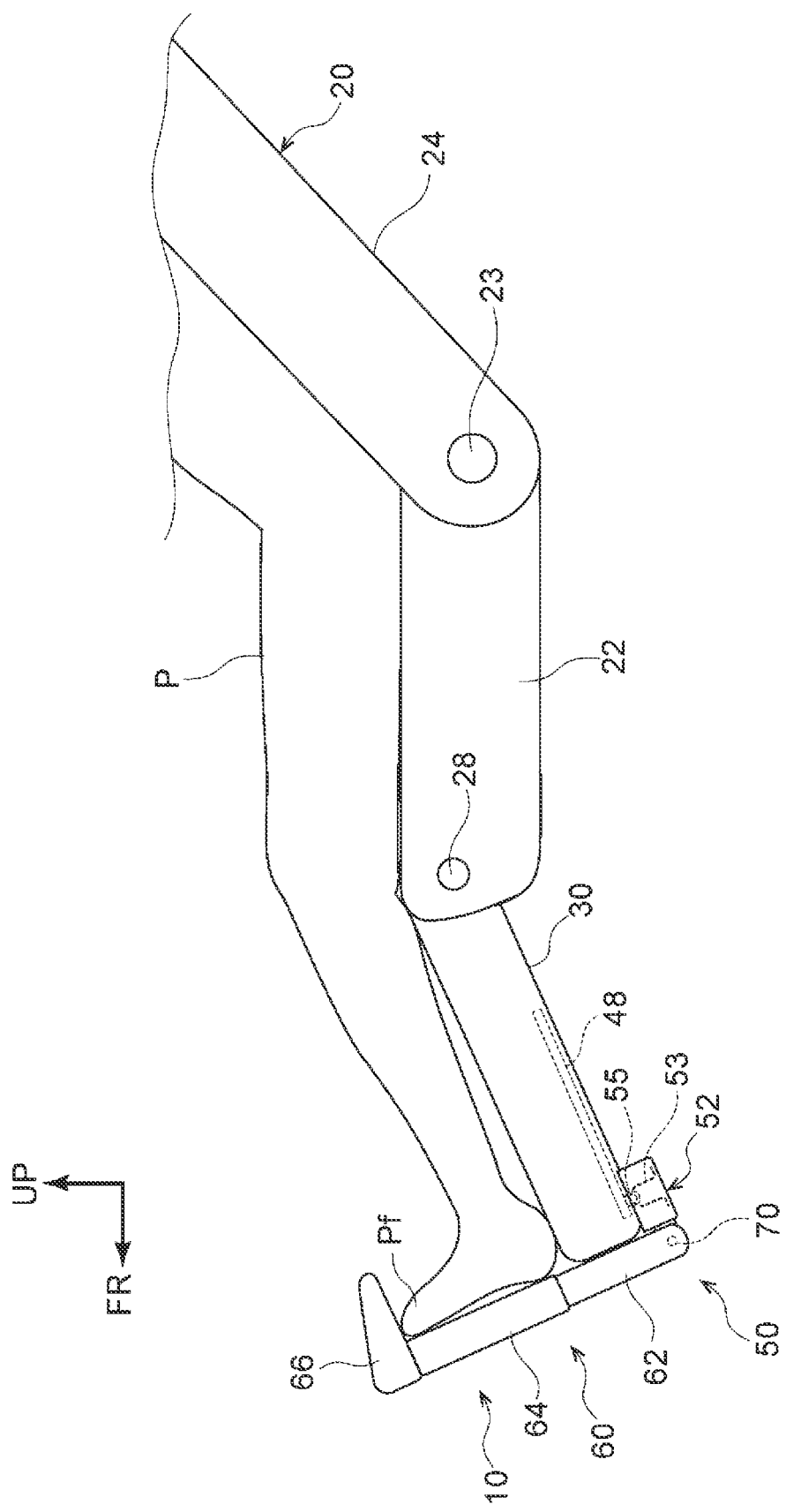
FIG. 23 is a side view showing the toe restraint device according to the modification of the third embodiment after operation.

As shown in FIGS. 22 and 23, the toe restraint member 60 may have a shape in which the toe portion 66 is raised upright in advance (a shape in which the toe portion 66 is set so as to be substantially perpendicular to the slide portion 64). With such a configuration, the structure of the toe restraint member 60 can be simplified as compared with the case where the toe portion 66 of the toe restraint member 60 is configured to be pivotable. That is, the cam mechanism 90, the motor 100, and the wind-up shaft 102 can be omitted, and the manufacturing cost of the toe restraint device 50 can be reduced.

The vehicle occupant restraint device 10 according to the present embodiment has been described above with reference to the drawings, but the vehicle occupant restraint device 10 according to the present embodiment is not limited to the illustrated examples and its design can be changed as appropriate within the scope of the present disclosure. For example, the fabric restraint member 13 is not limited to the mode in which the fabric restraint member 13 is extended in the width direction of the ottoman 30 manually by the occupant P, and may be configured to be automatically extended in the width direction of the ottoman 30.

Further, in the second embodiment, the front load transmission member 38 may have a shape in which the connecting portion 38B is not provided. That is, the front load transmission member 38 may be composed of only the pair of right and left side wall portions 38A. Further, the vehicle occupant restraint device 10 is not limited to the mode applied to the passenger seat of the vehicle, and can also be applied to the rear seat of the vehicle, the driver seat of the autonomous driving vehicle, and the like.

What is claimed is:

1. A vehicle occupant restraint device comprising:
    a seat cushion;
    a seat back that is provided on a seat rear side of the seat cushion so as to be pivotable in a seat front-rear direction;
    an ottoman provided on a seat front side of the seat cushion so as to be pivotable in a seat up-down direction; and
    a fabric restraint member that is extended in a width direction of the ottoman to restrain a lower limb including a knee of the occupant when at least the ottoman is set in a raised position and the seat back takes a comfortable posture,
    wherein the fabric restraint member is fixed with a plurality of fixtures provided on at least opposite side portions of the ottoman in the width direction, the fixtures being spaced apart from each other in the seat front-rear direction.

2. The vehicle occupant restraint device according to claim 1, wherein the fabric restraint member is configured to restrain a knee of an occupant.

3. The vehicle occupant restraint device according to claim 1, wherein the fixtures are each configured such that a first mold portion and a second mold portion are detachably fitted with each other.

4. The vehicle occupant restraint device according to claim 1, wherein the fabric restraint member has a function of improving comfort during sleep.

5. The vehicle occupant restraint device according to claim 1, further comprising a rear load transmission member that transmits a load input from the occupant to the ottoman to a seat frame supporting the seat cushion at a time of a frontal collision of a vehicle.

6. The vehicle occupant restraint device according to claim 5, wherein one end of the rear load transmission member is disposed close to a fixing point of the fabric restraint member.

7. The vehicle occupant restraint device according to claim 1, further comprising a front load transmission member that transmits a load input from the occupant to the ottoman to a floor portion of a vehicle cabin at a time of a frontal collision of a vehicle.

8. The vehicle occupant restraint device according to claim 1, further comprising a toe restraint member that projects from a seat front side of the ottoman to a seat upper side to restrain a toe of the occupant when at least the ottoman is set in the raised position and the seat back takes a comfortable posture.

9. The vehicle occupant restraint device according to claim 8, wherein the toe restraint member is configured such that a length of the toe restraint member is electrically adjustable in accordance with a size of a foot of the occupant.

10. The vehicle occupant restraint device according to claim 8, wherein the toe restraint member has a shape in which a toe portion of the toe restraint member is raised upright in advance.

11. The vehicle occupant restraint device according to claim 1, wherein the fabric restraint member is extended in the width direction of the ottoman and the seat cushion, and is fixed to both sides of a seat frame supporting the ottoman and the seat cushion in the width direction, respectively.

12. The vehicle occupant restraint device according to claim 1, wherein each fixture of the plurality of fixtures has a first mold portion and a second mold portion fitted to the first mold portion.

13. The vehicle occupant restraint device according to claim 12, further comprising a comfort mode transition switch configured to raise the ottoman and tilt the seatback rearward to at least a predetermined angle when the comfort mode transition switch is operated.

14. The vehicle occupant restraint device according to claim 13, wherein, when the first mold portion is not fixed to the second mold portion and the comfort mode transition switch is not operated, a voice alert is generated.

15. The vehicle occupant restraint device according to claim 13, wherein, when the comfort mode transition switch is operated and it is detected that an occupant is seated in a rear seat, operation of the ottoman and the seat back is stopped.

16. A vehicle occupant restraint device comprising:
a seat cushion;
a seat back that is provided on a seat rear side of the seat cushion so as to be pivotable in a seat front-rear direction;
an ottoman provided on a seat front side of the seat cushion so as to be pivotable in a seat up-down direction; and
a fabric restraint member that is extended in a width direction of at least the ottoman to restrain a lower limb including a knee of the occupant when at least the ottoman is set in a raised position and the seat back takes a comfortable posture,
wherein the fabric restraint member is fixed with a plurality of fixtures provided on a floor portion of a vehicle cabin that is located on both sides of the ottoman and the seat cushion in the width direction in a plan view, the fixtures being spaced apart from each other in the seat front-rear direction.

17. The vehicle occupant restraint device according to claim 16, wherein the fabric restraint member is extended in the width direction of the ottoman and the seat cushion, and is fixed to respective portions of the floor portion of the vehicle cabin that are located on both sides of the ottoman and the seat cushion in the width direction in a plan view.

18. A vehicle occupant restraint device comprising:
a seat cushion;
a seat back that is provided on a seat rear side of the seat cushion so as to be pivotable in a seat front-rear direction;
an ottoman provided on a seat front side of the seat cushion so as to be pivotable in a seat up-down direction;
a fabric restraint member that is extended in a width direction of the ottoman to restrain a lower limb including a knee of the occupant when at least the ottoman is set in a raised position and the seat back takes a comfortable posture; and
a toe restraint member that projects from a seat front side of the ottoman to a seat upper side when at least the ottoman is set in the raised position and the seat back takes a comfortable posture, the toe restraint member is configured such that a length of the toe restraint member is electrically adjustable.

* * * * *